Figure 1:
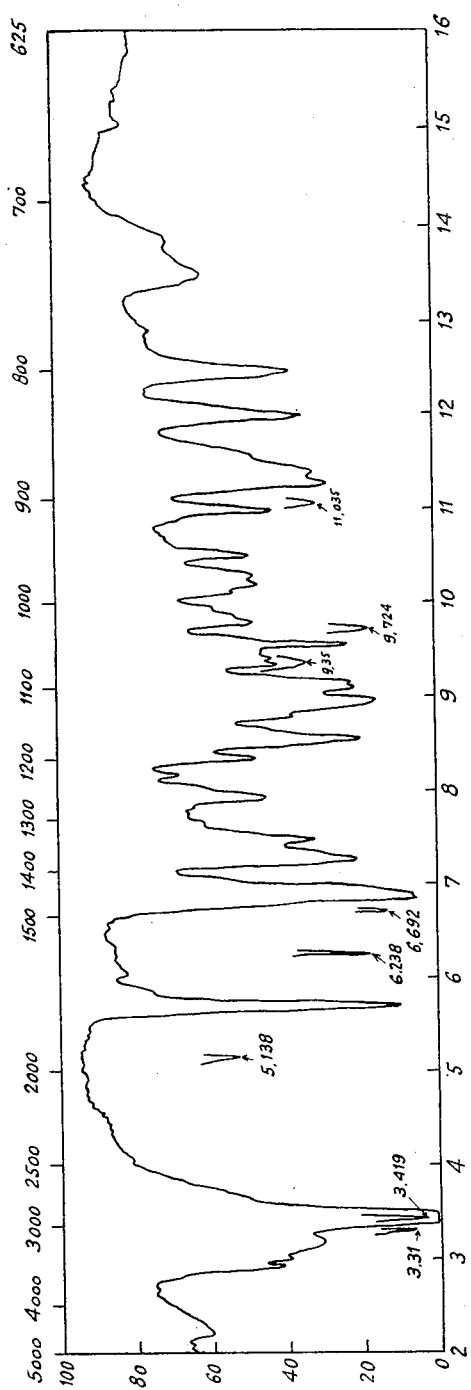
Figure 2:
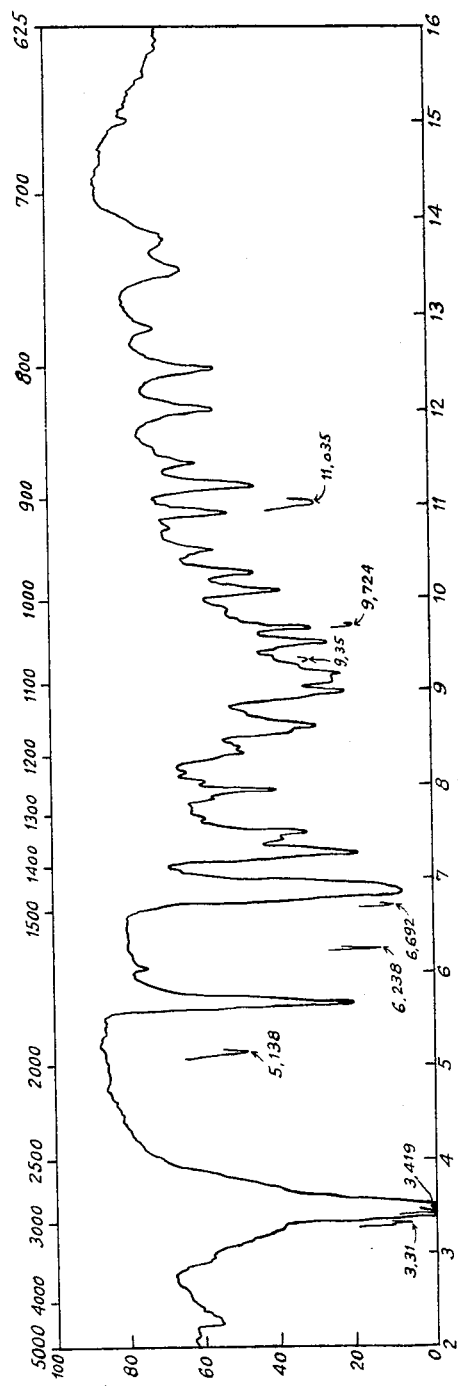
Figure 3:
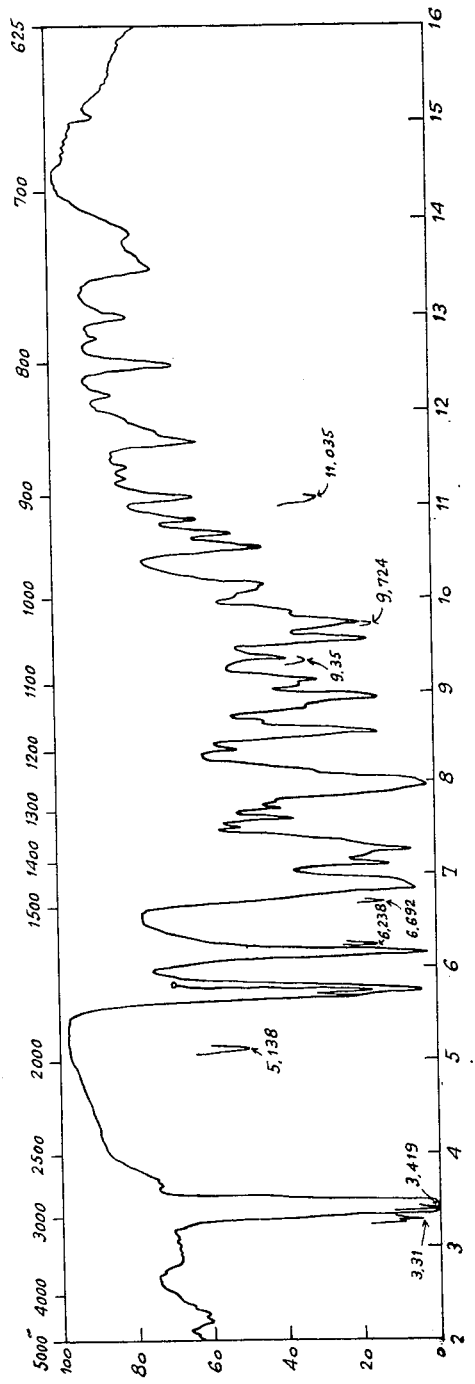
Figure 4:
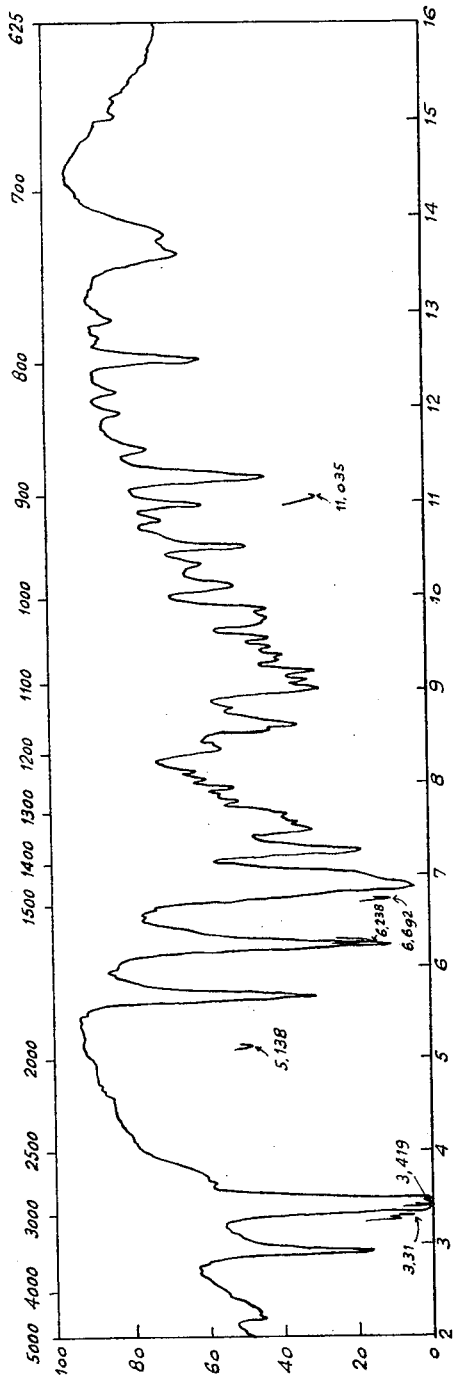
Figure 5:
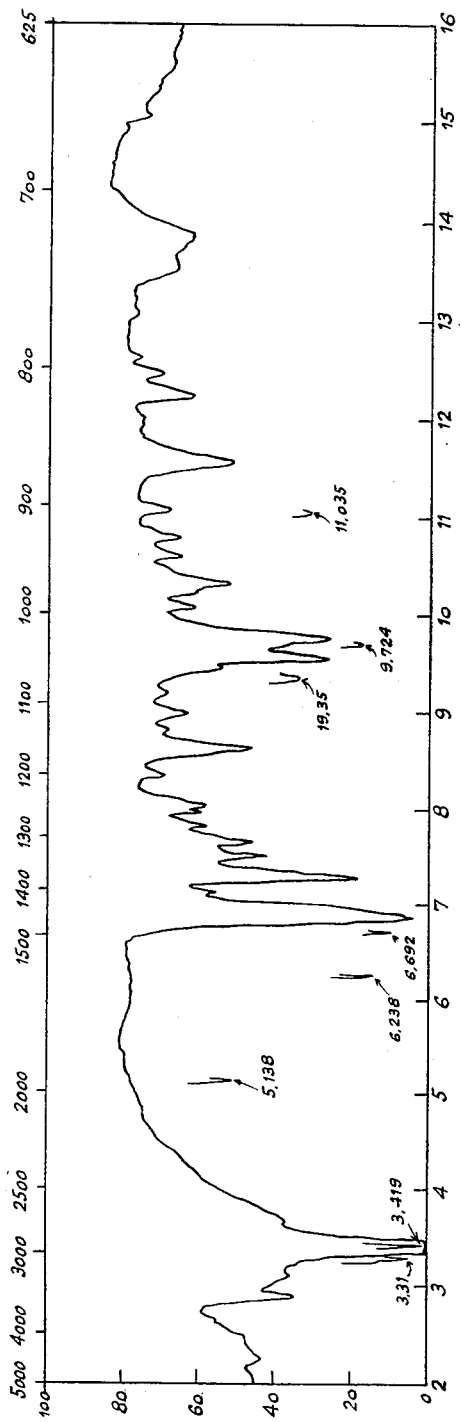
Figure 6:
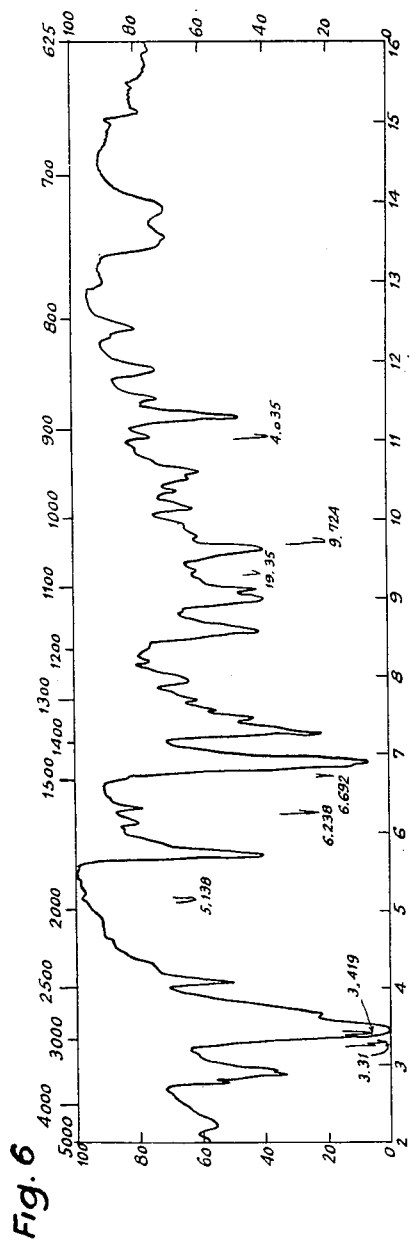
Figure 7:
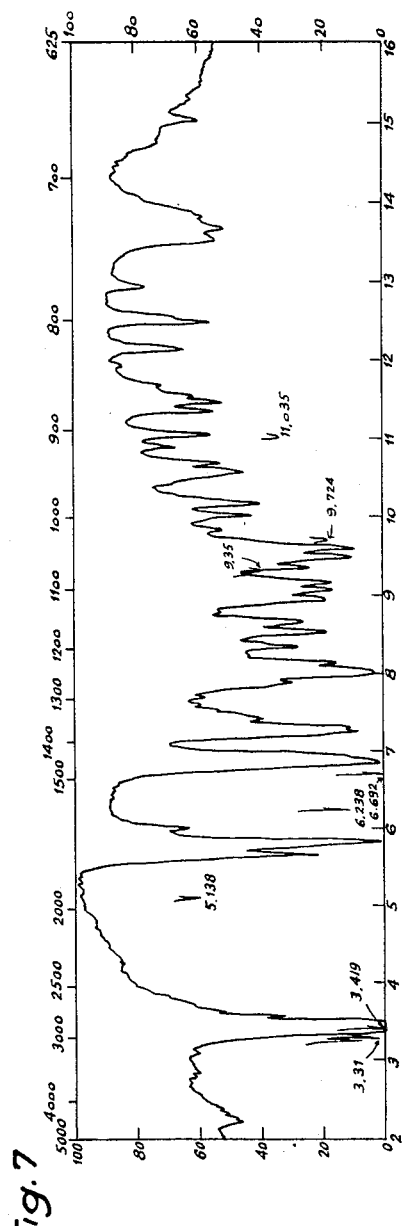
Figure 10:
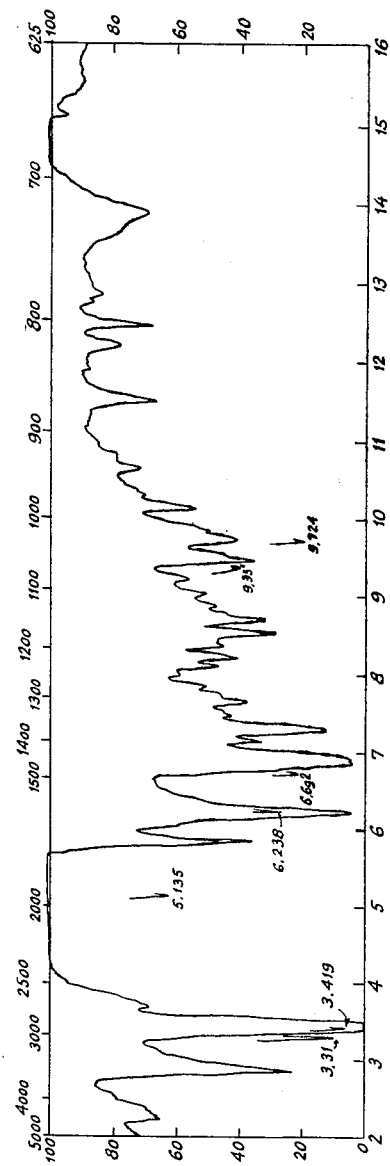
Figure 11:
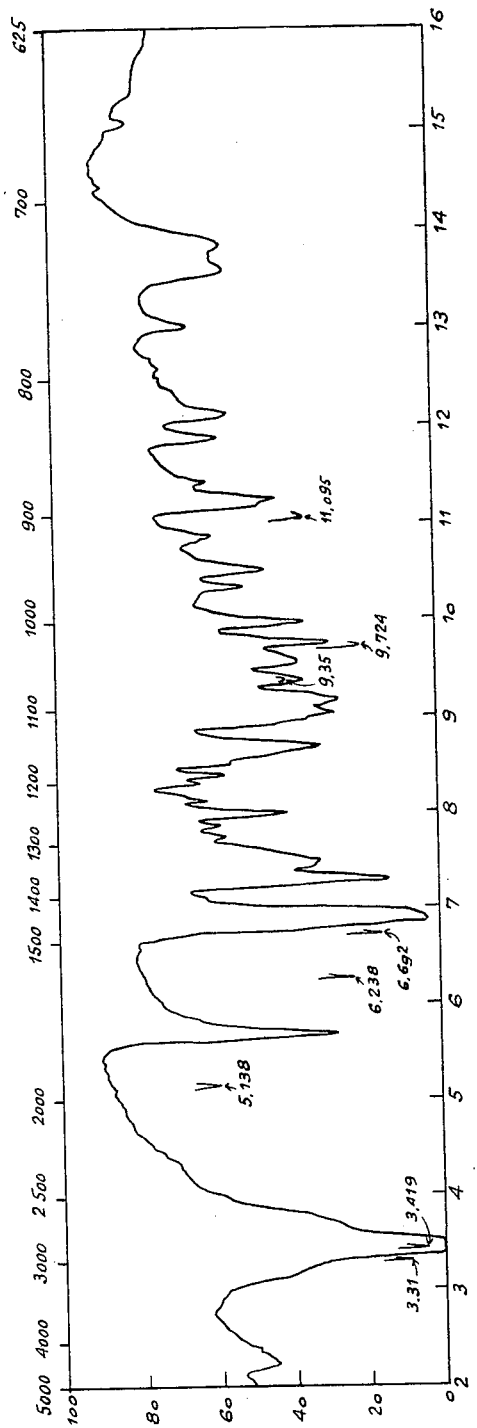
Figure 12:
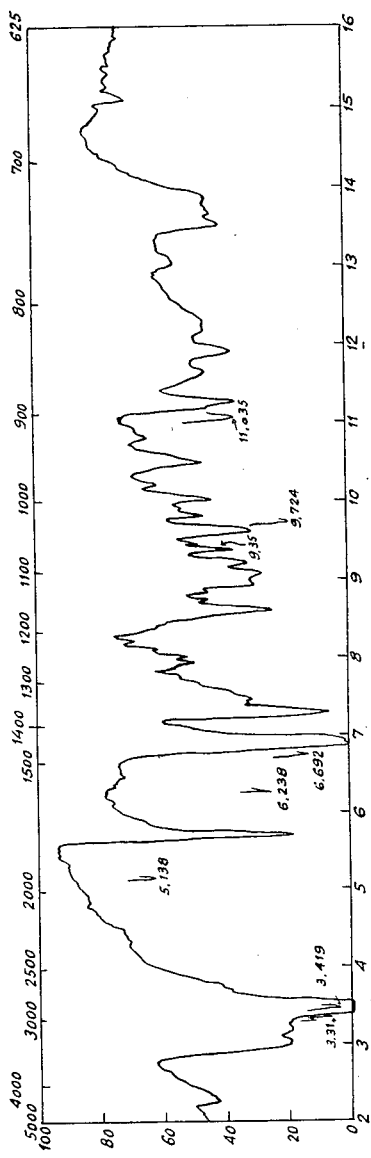
Figure 13:
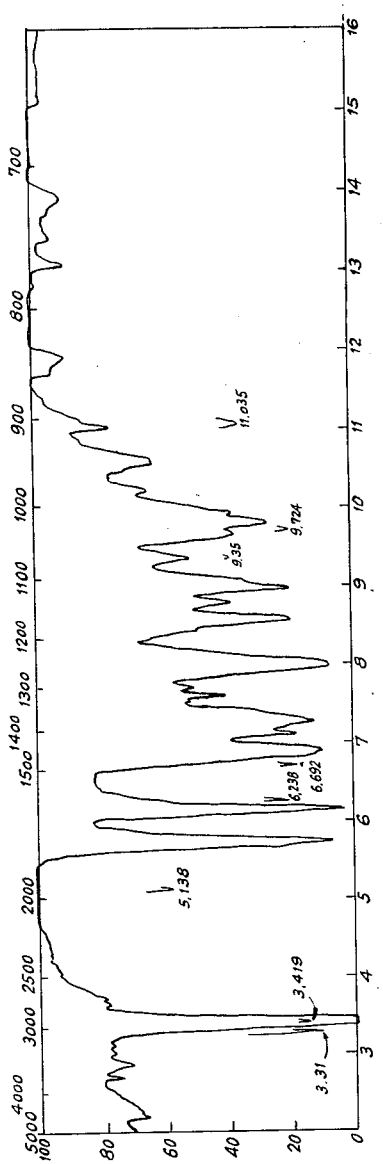
Figure 16:
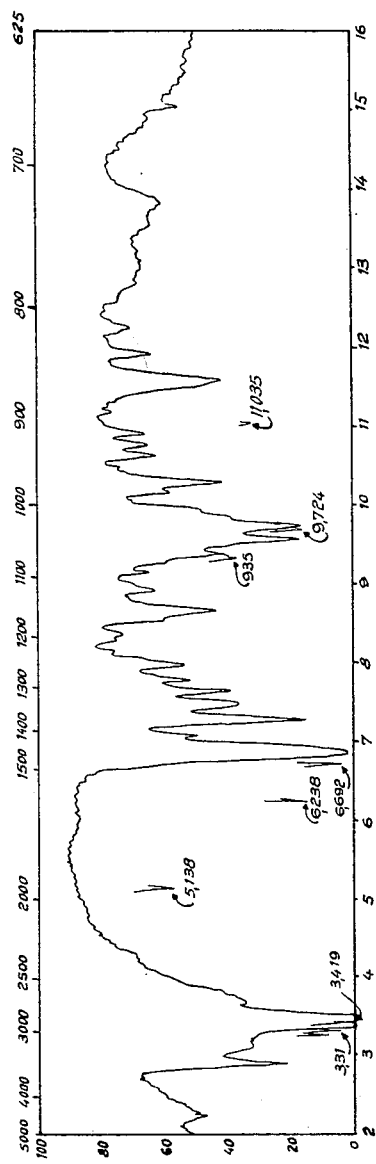
Figure 17:
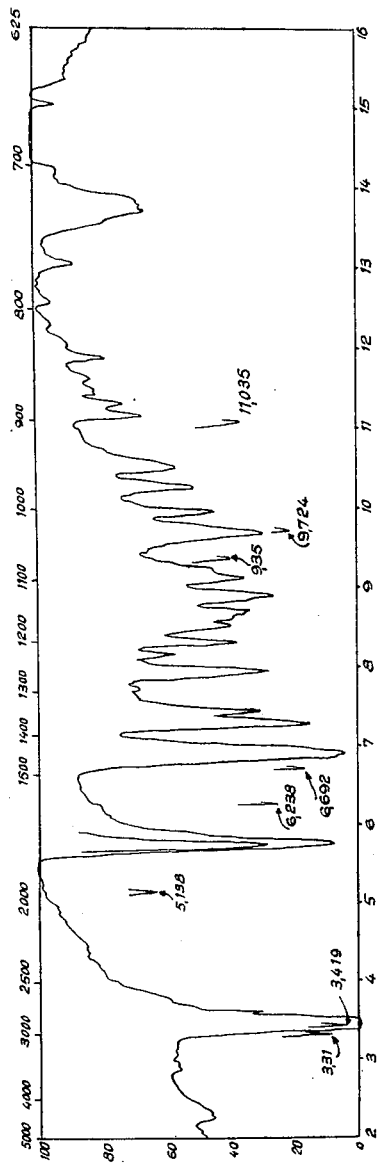
Figure 20:
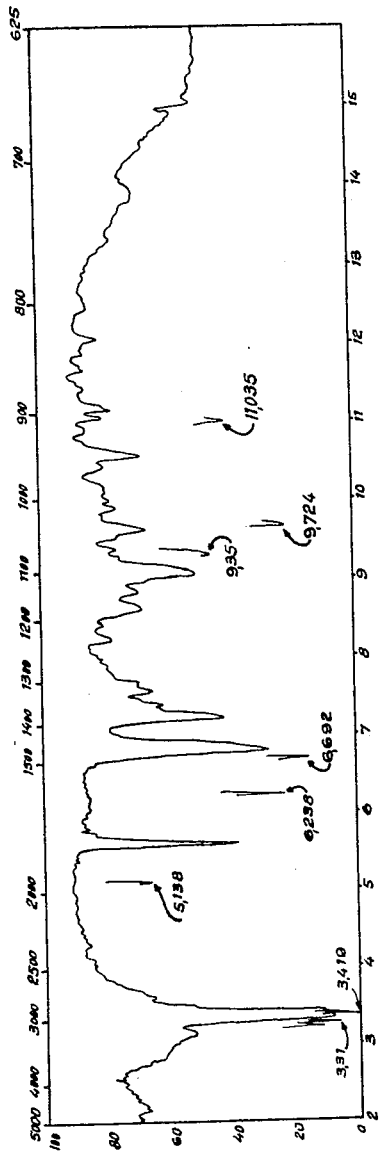
Figure 21:
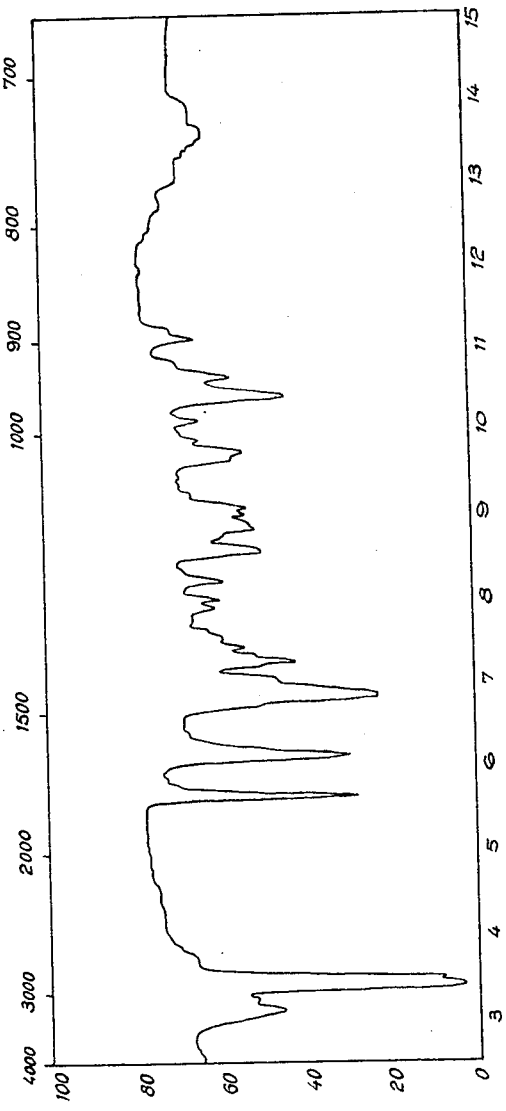
Figure 22:
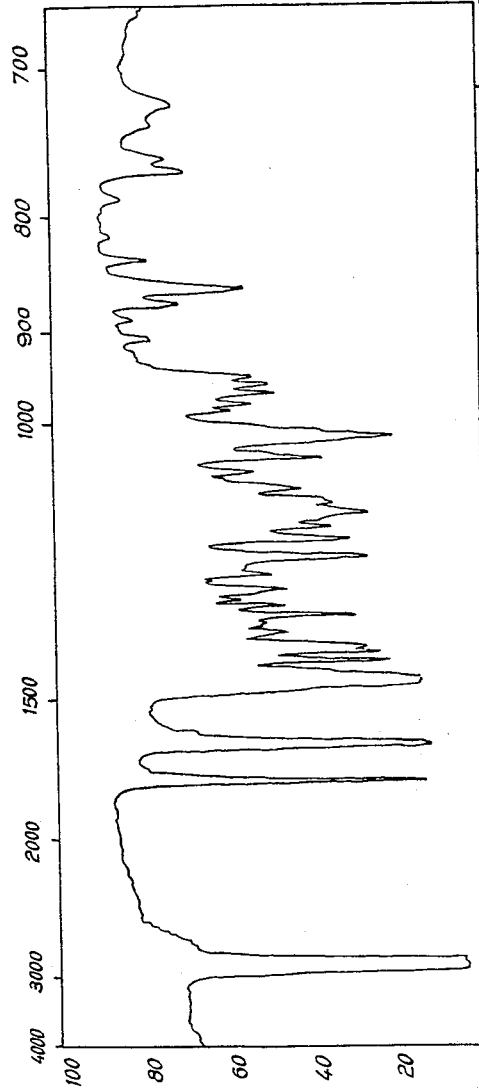
Figure 23:
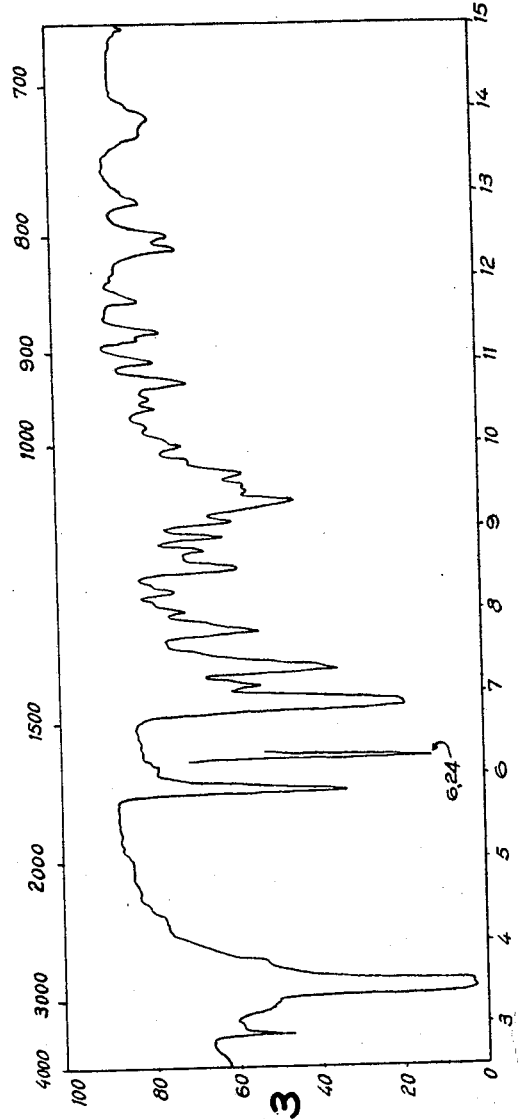
Figure 24:
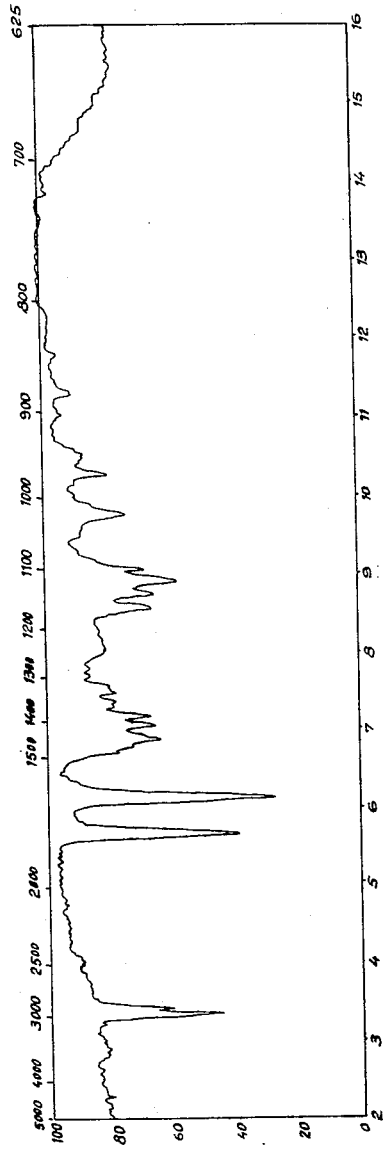
Figure 25:
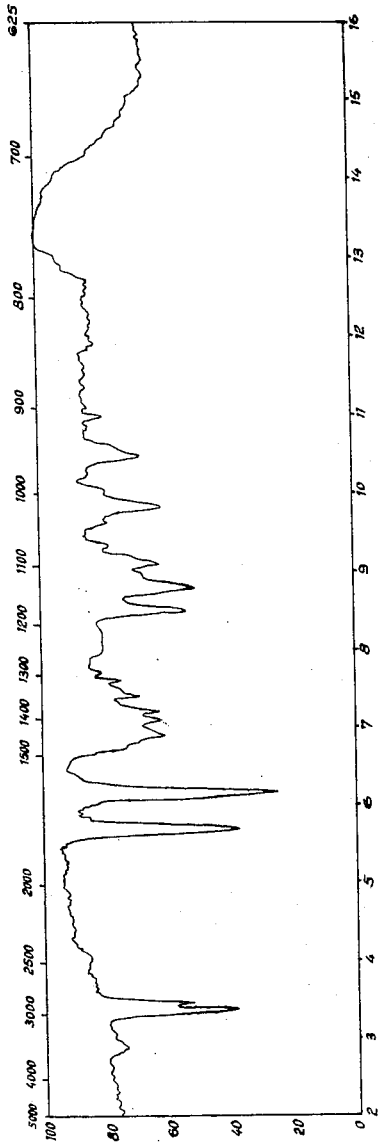
Figure 26:
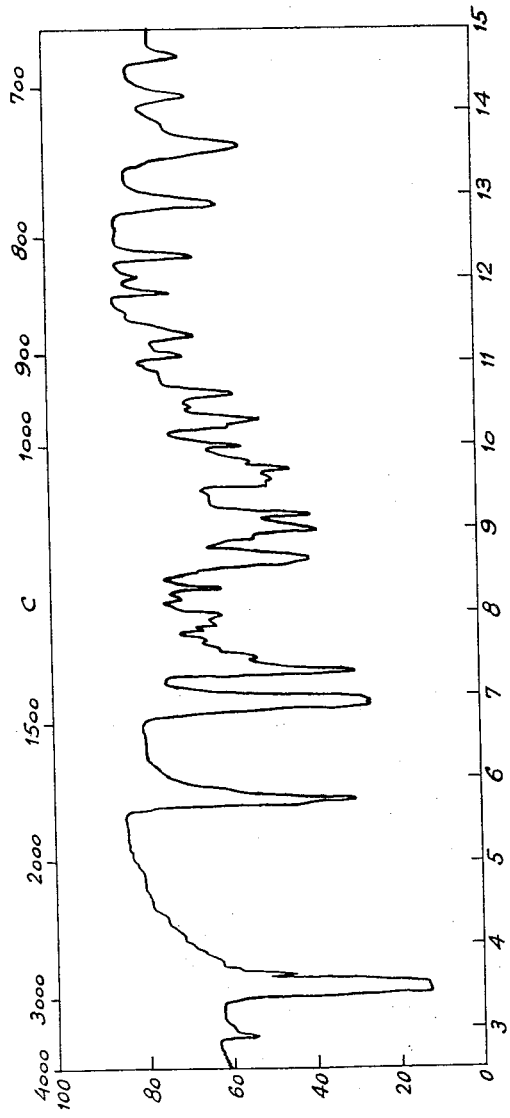
Figure 27:
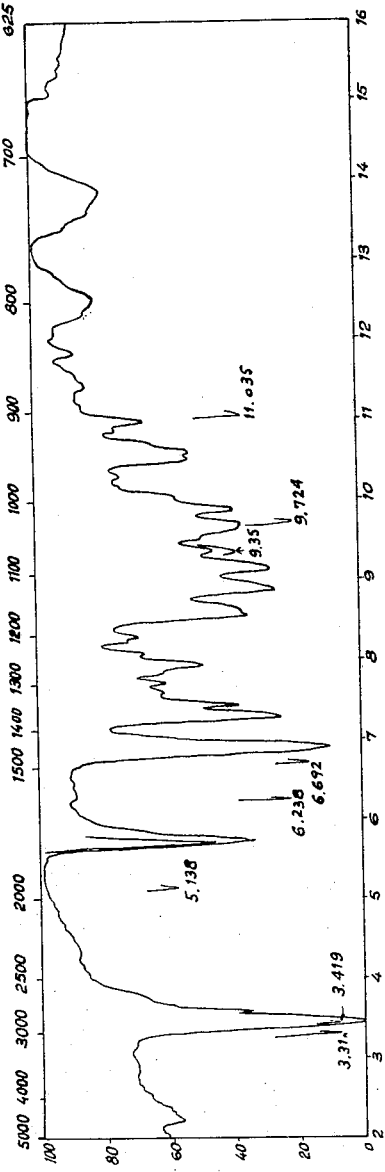
Figures 28, 29:
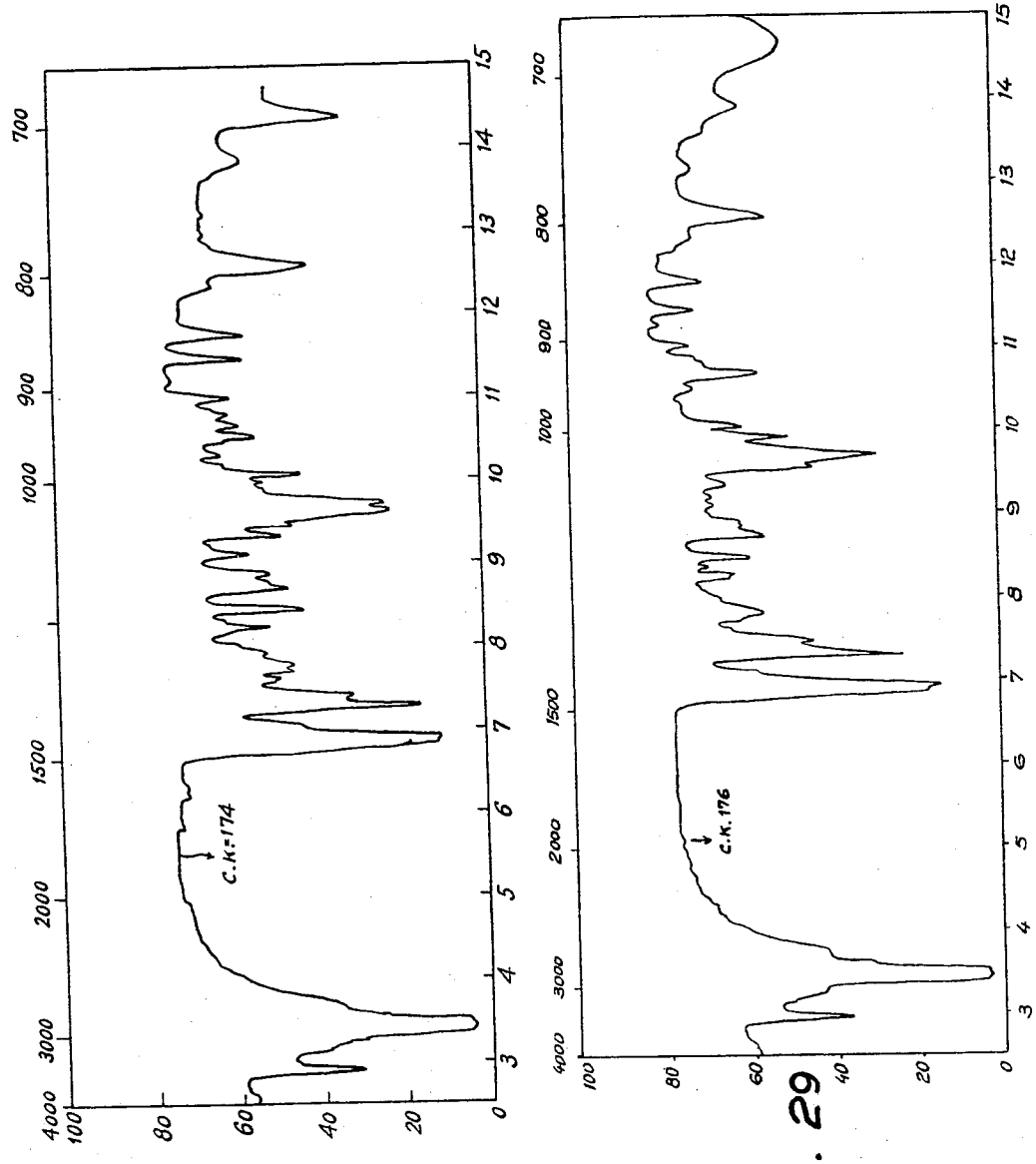

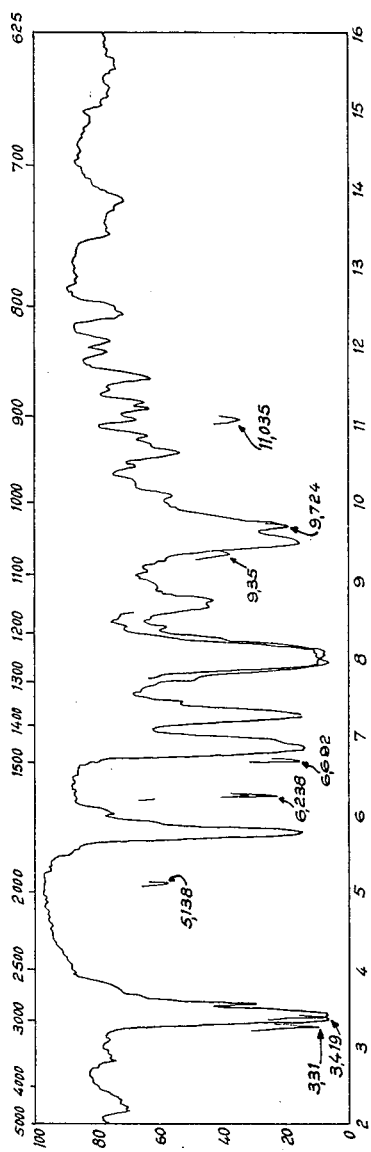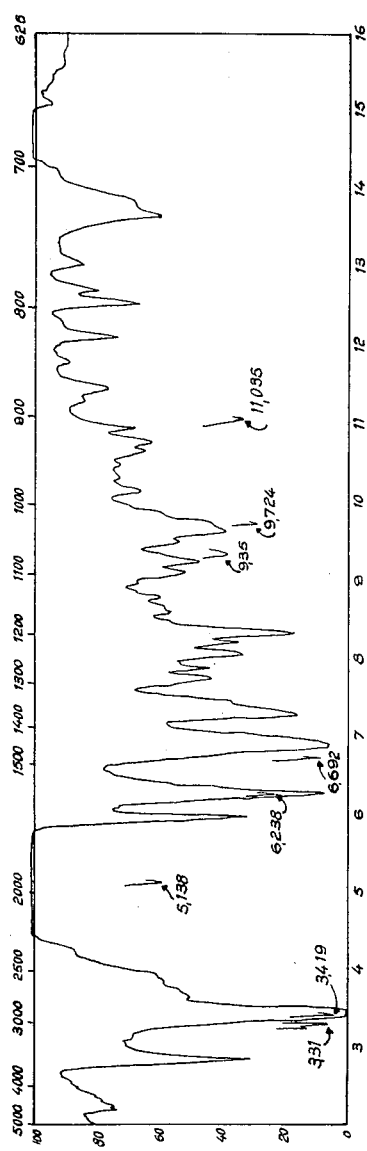

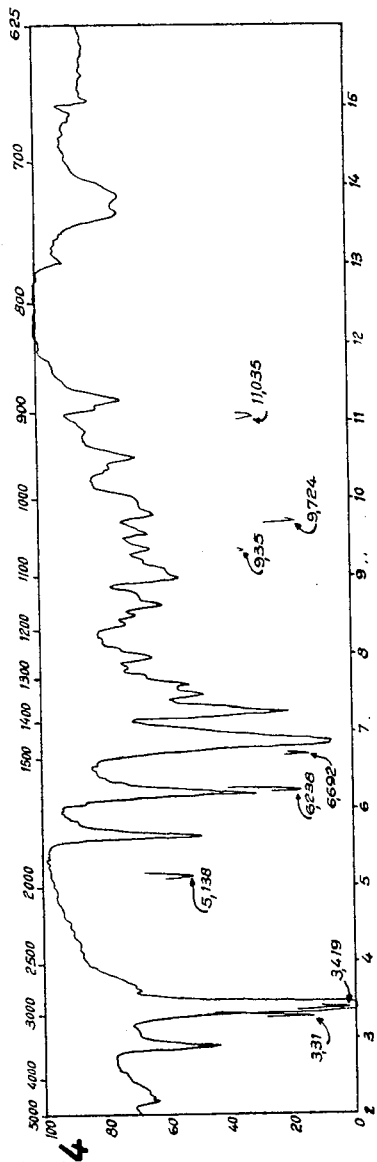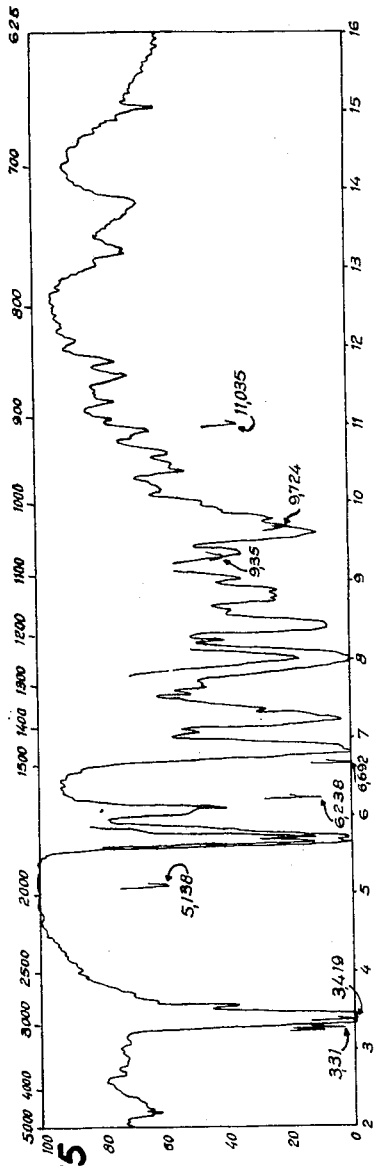

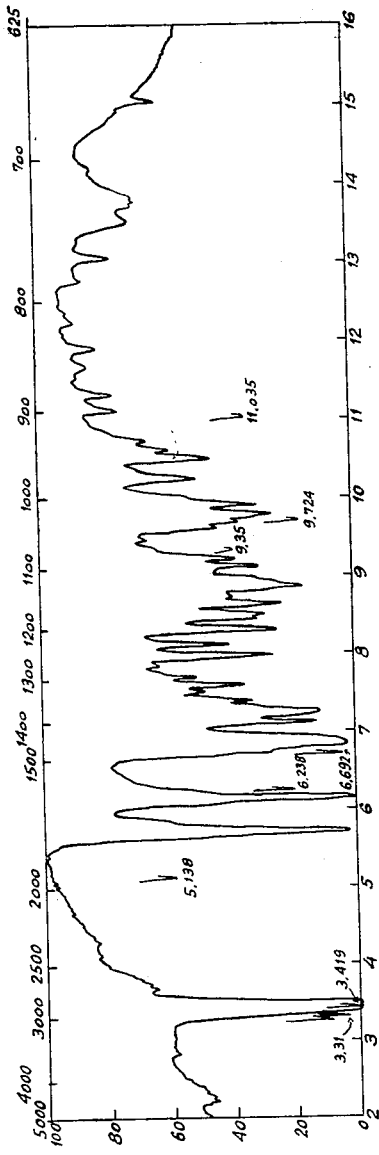
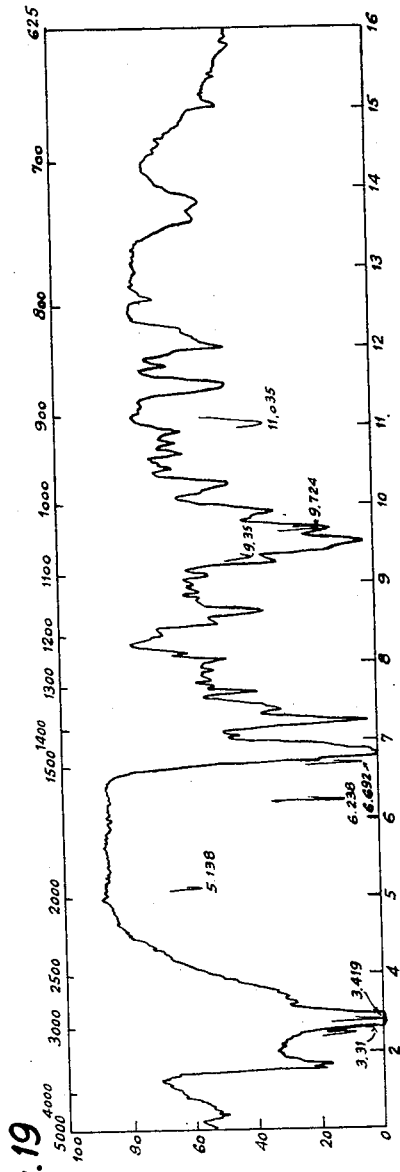
Fig. 18
Fig. 19

United States Patent Office 3,137,691
Patented June 16, 1964

3,137,691
METHOD FOR EXTRACTION OF PARAVALLARI-
DINE AND DERIVATIVES THEREOF
Jean Le Men, Limeil-Brevannes, France, assignor to
Roger Bellon, Neuilly-sur-Seine, France
Filed Feb. 2, 1962, Ser. No. 170,569
Claims priority, application Great Britain Feb. 8, 1961
20 Claims. (Cl. 260—239.57)

This invention relates to new alkaloids, derivatives thereof and to processes for their preparation.

Copending application No. 61,163 filed October 7, 1960, describes and claims an alkaloid which is referred to as paravallarine, and is obtained from *Paravallaris microphylla* Pitard and has the following formula

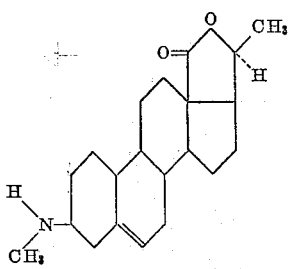

There are also described in this copending application various derivatives of this alkaloid, which are obtained either by substitution, or by opening of the lactone ring or by hydrogenation.

It has now been found that *Paravallaris microphylla* Pitard contains another alkaloid and the present invention is consequently concerned with a process for extracting this novel alkaloid and a process for preparing its derivatives; it is also concerned with the alkaloid itself and the derivatives of this alkaloid.

The new alkaloid, which is called paravallaridine, has an empirical formula of $C_{22}H_{33}O_3N$; and comprises three characteristic groups, namely: a secondary amine group; a lactone group; an alcohol group.

It also comprises a double bond which can be hydrogenated.

The melting point of this alkaloid is 228° C. (Maquenne block); its infra-red spectrum is shown in curve 1 of the drawing accompanying the provisional specification. This spectrum, as well as the other spectra attached to the present application, have been established by means of a double-beam Baird apparatus using a suspension of the product in paraffin oil.

The rotary power of paravallaridine is $(\alpha)_D^{20} = -52°$ (C=0.28 chloroform).

Having regard to the spectral similarity between paravallaridine and the paravallarine which has already been described, and in view of a common botanical origin, it may be thought that the new alkaloid has a structure similar to that of paravallarine and it simply comprises one additional hydroxyl function.

It could have been thought, therefore, that the formula of paravallaridine was as follows:

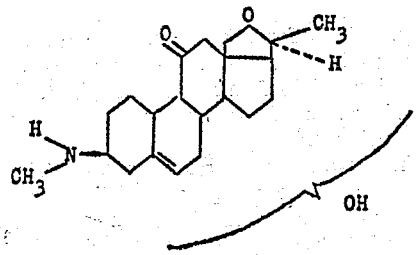

As a result of recent investigations, however, the applicant has been able to show that the exact formula of the paravallaridine is as follows:

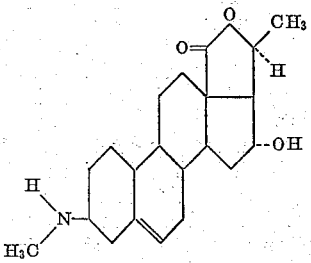

The experimental proofs of the accuracy of this formula are given below.

(1) Paravallaridine has the same carbon skeleton as paravallarine and the only difference existing between the two alkaloids is that the first has a supernumerary oxygen atom engaged in the form of a hydroxyl (secondary alcohol function).

In order to establish this first conclusion, the alcohol group of the mono-N-acetyl dihydro-paravallaridine, the compound described below, has been converted into a ketone group by means of the chromic anhydride in aqueous acetic medium.

The ketone obtained by this oxidation is $C_{24}H_{35}O_4N$ and is also described below, and has been reduced by the Clemmensen method. It is thus formed of a derivative which is likewise described below (MP. 258° C. $(\alpha)_D = -13.5°$ (C=0.25 chloroform) of the formula $C_{24}H_{35}O_3N$; this derivative only differs from the N-acetyl dihydroparavallarine $(C_{24}H_{37}O_3N)$ by the presence of a double bond in the 15–16-position.

The N-acetyl dihydroparavallarine has in effect been obtained, as hereinafter described, by catalytic hydrogenation of the N-acetyl-$\Delta_{15}$-dihydroparavallarine.

In similar manner, the ketone, 16-oxo-N-methyl-dihydroparavallarine, resulting from the paravallaridine, has been reduced to form the unsaturated $\Delta_{15}$ derivative, which has been catalytically hydrogenated into N-methyl dihydroparavallarine.

Finally, the N-ethyl-$\Delta_{15}$-dihydroparavallarinol, resulting from the paravallaridine, has been catalytically hydrogenated into N-ethyl dihydroparavallarinol.

The reduction of the ketone, 16-oxo-N-acetyl dihydroparavallarine by the Clemmensen method, would normally have had to lead to the corresponding saturated monodeoxidised derivative, that is to say, to the N-acetyl dihydroparavallarine. In fact, the product which is obtained certainly has the same melting point and the same rotatory power as the N-acetyl dihydroparavallarine, but it differs in its infra-red spectrum, essentially in the identification zone between 7 and 12$\mu$. By catalytic hydrogenation, the product obtained, resulting from the origin of the paravallaridine, is converted into a dihydrogenated derivative, the infra-red spectrum of which can be strictly superimposed on that of the N-acetyl dihydroparavallarine, originating from the paravallarine.

In the same manner, it has been possible for the N-methyl-$\Delta_{15}$-dihydroparavallarine and the N-ethyl-$\Delta_{15}$-dihydroparavallarinol, resulting from the paravallaridine, to be identified, after catalytic hydrogenation, respectively with the N-methyl dihydroparavallarine and the N-ethyl dihydroparavallarinol, prepared from the paravallarine.

This triple identification enables it to be concluded absolutely that the paravallaridine has the same carbon skeleton as the paravallarine and that these two molecules comprise, in common: an N-methylamino group in the 3$\beta$-position, a double bond at the 5-6-position and a lactone group at 18→20, but that the paravallaridine differs from the paravallarine by the presence of a secondary alcohol function in one position, the determination of which will hereinafter be proved.

The proof of the double bond at the 5-6-position results from the fact that the conversion of the paravallaridine derivatives to the homologous derivatives of the dihydroparavallaridine is accompanied by a variation in the negative molecular rotation of the order of 100° ($\Delta M_D = M_D$ of the unsaturated derivative $-M_D$ of the hydrogenated derivative), as in the case of the converting of the paravallarine derivatives to those of the dihydroparavallarine.

(2) The supernumerary secondary alcohol group of the paravallaridine is in the 16-position.

The two ketones resulting from the chromic oxidation, either the N-acetyl dihydroparavallaridine or the N-methyl-dihydroparavallaridine, show in the infrared an absorption band C=O carbonyl, in part covered by the C=O band of the γ-lactone and situated at $5.7\mu \pm 0.03\mu$. The position of this band is characteristic of the presence of a ketone function on a ring having five elements (cyclopentanone). The result is that the ketone function of these derivatives is situated on the pentane D ring of the steroid skeleton, either in the 15-position or the 16-position. The 15-position is immediately excluded, since the formation of a ketone function in this position on a pregnane steroid skeleton causes a variation in the molecular rotation in the positive direction of the order of +106° (according to Fieser and Fieser, "Steroids," edition 1959, p. 179). On the other hand, the creation of a ketone in the 16-position is accompanied by a very negative variation in the molecular rotation (according to Klyne, The Chemistry of the Steroids, 1957 edition, p. 55).

The two ketones referred to above and hereinafter described respectively have the following specific rotatory powers:

16-oxo-N-acetyl dihydroparavallarine: $(\alpha)_D^{20} = -247°$; (C=0.21, chloroform).
16-oxo-N-methyl dihydroparavallarine: $(\alpha)_D^{20} = -221°$; (C=0.16, chloroform).

(3) The secondary alcohol group in the 16-position of the paravallaridine is oriented into α.

The easy acetylation of the secondary alcohol group of the paravallaridine and correlatively the easy saponification of the resulting acetylated derivative are in favour of a 16α orientation of the alcohol group of the paravallaridine. An inverse β orientation would lead to a serious congestion, due to the lactone ring and to a chemical passivity.

This conclusion, resulting from chemical arguments, is even corroborated by taking into consideration the molecular rotations.

The examination of the pairs of derivatives of the paravallaridine and of corresponding derivatives of paravallarine indicates that the contribution of the hydroxyl group leads to a variation of the order of −40° to −90°. According to D. K. Fukushima and T. F. Gallorgher (J. Amer. Chem. Soc. 1951, 73, 1960), the variation due to the presence of hydroxyl is −60°, when this hydroxyl is orientated into 16α.

Thus, both the chemical arguments and the physical arguments contribute to proving that the hydroxyl function of the paravallaridine fixed at the 16-position is oriented into α.

The structure of the paravallaridine is thus proved and this compound therefore has the following nomenclature: (20S) - 3βN - methylamino 16α,20 - dihydroxyl - 18 - oic - lactone (→20)-pregna-5-ene.

Starting from the paravallaridine, a certain number of substituted derivatives have been obtained.

In particular, the N-methyl-paravallaridine or (20S)- 3βN - dimethylamino - 16α,20 - dihydroxy - 18 - oic lactone (→20)-pregna-5-ene has been prepared, in which the hydrogen of the amine group of the paravallaridine is substituted by a methyl radical; this compound can moreover be obtained directly from the total alkaloids separated at the time of treatment of the *Paravallaris microphylla* Pitard.

This compound has an empirical formula of $$C_{23}H_{35}O_3N$$

its melting point is 200° C. (Maquenne block); its rotatory power is $(\alpha)_D^{20} = -49°$ (C=0.29 chloroform) and its infra-red spectrum is given in curve 2 of the accompanying drawing.

The diacetylated derivative of paravallaridine has also been prepared, and the formula thereof is:

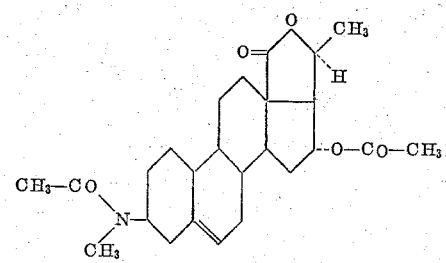

This derivative corresponds to the scientific name (20S) - 3βN - methyl - N - acetylamino - 16α - acetoxy-20-hydroxy-18-oic-lactone (→20)-pregna-5-ene.

The melting point of this compound is 240° C.; its rotatory power is $(\alpha)_D^{20} = -36°$; (C=0.45 chloroform).

Curve 3 of the accompanying drawing shows the infrared spectrum of this compound, which is characterised on the one hand by an N-acetyl band at 6.1 microns and on the other hand by an O-acetyl band at 5.72 microns.

The mono-N-acetylated derivative of the paravallaridine has likewise been obtained, and in this derivative the hydrogen of the amine function of the paravallaridine is substituted by an acetyl radical; this compound which has the name of (20S)-3βN-methyl-N-acetylamino-16α, 20 - dihydroxy - 18 - oic - lactone (→20) - pregna - 5-ene, has the empirical formula $C_{24}H_{35}O_4N$ and its melting point is 261° C. (block). Its infra-red spectrum is shown in curve 4 of the accompanying drawing.

By treating the paravallaridine or its derivatives with the object of opening the lactone function, two new alcohol functions have been obtained, as has been described in the copending application referred to above.

Starting from the N-methyl-paravallaridine, it has been possible to obtain a triol having the following formula:

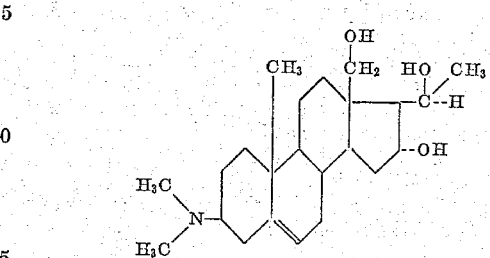

this compound conforming the name of (20S)-3β-dimethylamino-16α,18,20-trihydroxy-pregna-5-ene.

The melting point of this compound is 260° C. and its infra-red spectrum is shown in curve 5 of the accompanying drawing.

There have moreover been obtained a certain number of substituted derivatives of paravallaridine, the existence of which has further confirmed the accuracy of the paravallaridine formula.

These derivatives are:
paravallaridine hydrochloride or (20S)-3N-methylamino-16α,20-dihydroxy-18-oic lactone (→20)-pregna-5-ene hydrochloride (infra-red spectrum on curve 6),
-o-acetyl-N-methyl paravallaridine or (20S)-3βN-dimethylamino - 16α - acetoxy-20-hydroxy-18-oic lactone (→20)-pregna-5-ene (infra-red spectrum on curve 7),
triacetylated derivative of N-methyl-paravallaridine triol or (20S) - 3βN-dimethylamino - 16α,18,20 - triacetoxy pregna-5-ene (infra-red spectrum on curve 8),
the N-acetyl paravallaridinic acid or (20S)-3N-methyl-N-acetylamino-16α,20-dihydroxy-18-oic pregna-5-ene (infra-red spectrum on curve 9),
the methyl ester of N-acetyl paravallaridinic acid or (20S) - 3N - methyl - N-acetylamino-16α,20-dihydroxy-18-methoxycarbonyl pregna-5-ene (infra-red spectrum on curve 10).

The different paravallaridine compounds mentioned above thus correspond to the following formula:

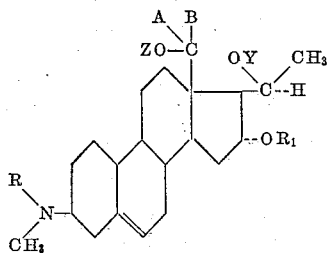

in which R and $R_1$ can represent a hydrogen atom, a low alkyl radical or an acetyl radical; Y can represent an acetyl radical or a hydrogen atom or a bond with the 18-carbon atom; Z represents a second bond with the 18-carbon atom (A then representing nothing at all) or a hydrogen atom or an acetyl radical; A represents a hydrogen atom or nothing and B represents a hydrogen atom, an $OR_2$ radical ($R_2$ being a hydrogen atom or an acetyl radical), or, in common with Y, the bond of the 18-carbon atom the oxygen attached to the 20-carbon atom.

In addition, as described in the copending application referred to above, it is possible to obtain compounds dihydrogenated in the 5-6-position from paravallaridine and its derivatives by catalytic hydrogenation at ordinary pressure and temperature.

Starting from the N-methylated derivative of paravallaridine, there has thus been obtained the dihydro-N-methyl paravallaridine, the empirical formula of which is $C_{23}H_{37}O_3N$; its name is (20S)-3βN-dimethylamino-16α, 20-dihydroxy-18-oic lactone (→20)5α-pregnane.

This compound melts at 237° C.; its rotatory power is $(\alpha)_D^{20} = -21°$ (C=0.28 chloroform) and the infra-red spectrum thereof is given in curve 11.

In addition to this compound, other dihydrogenated derivatives of paravallaridine have been obtained, these being hereinafter referred to in Examples 13 to 24.

The new compounds provided by the invention are interesting in the therapeutic field; in particular, they act on the rhythm and amplitude of the movements of the heart.

They are also of great interest as intermediates for the preparation of derivatives of the 18-oxygenated steroid series, which have the additional advantage with respect to paravallarine of having an oxygen atom in the 16-position; in general, for the known steroids, this causes an increase in the importance of the physiological properties of the anti-inflammatory type.

As already indicated, the present invention is concerned with a process for the preparation of the alkaloids contained in *Paravallaris microphylla* Pitard.

As already described in the previously mentioned copending application, paravallarine can equally well be obtained by treating the leaves and the stems as well as the roots of *Paravallaris microphylla* Pitard; the plant is reduced to powder; it is treated with an alkali agent such as ammonia and the whole is subjected to an extraction with an organic solvent which is not miscible with water, excluding higher alcohols.

According to the present invention, the base alkaloids contained in the organic phase are converted into salts and there is used for this purpose a solution of oxalic acid in water, an alcohol or a ketone having at the most five carbon atoms, this making it possible to obtain directly, after filtration, the oxalates of paravallarine and of paravallaridine, as well as their N-methylated derivatives.

Oxalic acid has the essential advantage of permitting a precipitation of the two principal alkaloids which are obtained with a particularly good yield.

According to a modification, it is possible first of all to cause all the alkaloids of the organic extraction phase to pass into a dilute aqueous solution of a mineral acid such as hydrochloric acid or sulphuric acid and then to raise the pH value to above 7, for example by means of ammonia, this causing the precipitation of all the alkaloids; the alkaloids are again dissolved in a solvent which is immiscible with water, excluding higher alcohols, and the organic solution is treated according to the invention with an oxalic acid solution.

In this way, there are obtained the oxalates of paravallarine, paravallaridine and their N-methylated derivatives.

According to another feature of the invention, after the conversion to the bases, starting from oxalates, a selective solvent is used which permits the paravallaridine to be separated from the other alkaloids, this selective solvent being benzene, in which only the paravallaridine is insoluble.

In the fractions soluble in benzene, there is found paravallarine, N-methyl-paravallarine and N-methyl-paravallaridine; these different alkaloids can be separated either by chromatography, or by fractionated crystallisation in acetone or methyl ethyl ketone; it is also possible first of all to separate a fraction having a high paravallarine content by means of a selective solvent, such as cyclohexane, in which the paravallarine is sparingly soluble, and then possibly to carry out a fractionated crystallisation.

In order to purify the paravallaridine contained in the fraction insoluble in benzene, it is possible to proceed by way of fractional crystallisation in acetone, methyl ethyl ketone or even an alcohol of low molecular weight, or even in a mixture of these solvents possibly diluted with water.

The invention is further illustrated by the following examples:

EXAMPLE 1

Starting from all the alkaloids in a mass of alkaloids comprising especially N-methyl paravallarine, paravallarine, N-methyl-paravallaridine and paravallaridine, the first step is the separation thereof, followed by fractionation.

The solution of 31 g. of oxalic acid in 440 cc. of acetone is added while stirring to a solution of 10 g. of total alkaloids obtained according to the process described in the aforementioned patent application in three litres of ethylene chloride. After standing for one day, the precipitate which has formed is isolated by filtration, with the assistance if necessary of a filtration adjuvant. The precipitate of oxalates of alkaloids is treated at boiling point with 1 litre of aqueous ethyl alcohol at 70°. Insoluble impurities are separated by filtration and the filtrate is concentrated by distillation. The remaining acid aqueous solution is made alkaline with ammonia and the precipitate which has formed is immediately extracted with 1 litre of chloroform. The chloroformic solution, separated by decantation, washed with pure water, dried with dry sodium sulphate and distilled, leaves a residue which weighs 5.5 g. and is a mass of alkaloids comprising especially N-methyl-paravallarine, paravallarine, N-methyl-paravallaridine and paravallaridine.

This mixture of alkaloids is treated with 60 g. of benzene at boiling point. The insoluble fraction A, weighing 2.1 g., and the solution B are separated by hot filtration.

The insoluble fraction A is dissolved at boiling point in 20 cc. of methanol. Distilled water is added dropwise to this hot solution while stirring until precipitation commences. By cooling, a precipitate weighing 1.6 g. is formed, and this is isolated by filtration. This precipitate is redissolved completely in 80 cc. of acetone; by concentrating this solution of 35 cc. and cooling, 0.9 g. of paravallaridine crystals are deposited, and these are separated by filtration.

The benzene solution B, cooled to normal temperature and freed by filtration from a few insoluble products, is subjected to chromatography on 250 g. of alumina having the activity factor I (Brockmann scale).

After passing through 1 litre of benzene, the elution is followed (a) by two litres of the mixture of 9 parts of benzene and 1 part of ethyl ether oxide;

(b) by 8 litres of pure ethyl ether oxide;

(c) by 2 litres of the mixture of 95 parts of ethyl ether oxide and 5 parts of methanol.

Each of these fractions is distilled until a dry residue is obtained.

The fraction (a), weighing 2.3 g., is completely dissolved in 1.5 litres of ether; by concentration of this solution until it starts to become cloudy and cooling, 0.3 g. of white needles are formed, these being isolated by filtration and consisting of N-methyl-paravallarine.

The fraction (b), weighing 2.7 g., is taken up in 25 cc. of boiling acetone. The filtered acetone solution leaves 1.3 g. of paravallarine on cooling.

The fraction (c), weighing 1.8 g., is dissolved in 1 litre of ether at boiling point. By concentration until precipitation commences and by cooling, the N-methyl-paravallaridine is separated out.

Analysis of the paravallaridine, for the empirical formula $C_{22}H_{33}O_3N$, shows—

Calculated (percent): C=73.50; H=9.25; O=13.35. Found (percent): C=73.70, C=73.41; H=9.19, H=8.95; O=13.95.

EXAMPLE 2

In this example, the preparation of the alkaloids is carried out without separating the total alkaloids, that is to say, by adding a solution of oxalic acid in acetone to the extraction solution of the total alkaloids.

1 kg. of powdered leaves of *Paravallaris micryophylla* Pitard are made alkaline by trituration with 500 cc. of 10% ammoniacal solution and the mixture extracted in the cold into an extraction tube by continuous lixiviation with 8 litres of methylene chloride. The extracted organic solution is concentrated to 2 litres by distillation and 25 g. of oxalic acid dissolved in 300 cc. of acetone are added while stirring. By standing for 24 hours at normal temperature, a greenish deposit is formed which is isolated by filtration on a Buchner filter filled with 50 g. of kieselguhr. 5 g. of decolourising carbon are also added to the precipitate retained on the filter by the 50 g. of kieselguhr and the whole is extracted, three times at boiling point, with 300 cc. of ethyl alcohol at 70°. The filtered alcoholic solutions are combined and the alcohol is removed by distillation. The remaining aqueous solution is made alkaline by means of ammonia and yields a precipitate which is immediately extracted with 750 cc. of methylene chloride. The organic solution is separated by decantation, washed in pure water, dried on dry calcium chloride and distilled, and leaves a residue which weighs 8.7 g.; this residue is a mass of alkaloids comprising especially paravallaridine, paravallarine and their methylated derivatives.

These 8.7 g. of alkaloids, treated at boiling point with 100 cc. of benzene, leave an insoluble substance A weighing 3.6 g. and a solution B.

The insoluble fraction A is purified by fractional crystallisation in aqueous methanol and acetone, as in Example 1, and yields 1.2 g. of paravallaridine.

The solvent is removed from the solution B and the residue is heated under reflux for 1 hour with 50 cc. of cyclohexane. The deposit $B_1$ which remains in the cooled solution is separated by filtration from solution $B_2$.

The deposit $B_1$, weighing 1.8 g., is dissolved at boiling point 100 cc. of methyl ethyl ketone. The solution, concentrated until precipitation commences, leaves a slightly yellow powder which is isolated by filtration and which yields 0.9 g. of paravallarine when recrystallised again in acetone.

The solution $B_2$, evaporated to dryness, leaves a residue of 3.3 g., which is dissolved in 100 cc. of benzene. This benzene solution is subjected to chromatography on 100 g. of alumina with the activity index I (Brockmann scale).

The elution is effected successively with:

(a) 500 cc. of the mixture of 9 parts of benzene and 1 part of ethyl ether.

(b) 1 litre of the mixture of 95 parts of ethyl ether and 5 parts of methanol.

Each of these two fractions is distilled until a dry residue is obtained, which is weighed and redissolved in 1 litre of ether. By concentration of this ethereal solution until precipitation commences, a crystalline deposit is formed which is isolated by filtration. The fraction (a), weighing 1.7 g., thus provides 0.2 g. of N-methyl-paravallarine and the fraction (b) yields 0.15 g. of N-methyl-paravallaridine.

EXAMPLE 3

*N-Methyl-Paravallaridine*

500 mg. of paravallaridine are heated for 6 hours at 100° C. with 5 cc. of formic acid and 10 cc. of 30% formal solution. The reaction solution, diluted with 500 cc. of water and adjusted to a pH value of 13 with potassium hydroxide, is extracted with chloroform (500 cc.— 250 cc. and 250 cc.). The chloroformic solutions are combined, washed with water, dried and distilled to dryness, and leave a white residue weighing 492 mg., which yields 360 mg. of N-methyl-paravallaridine by crystallisation in acetone.

The analysis gives, for an empirical formula of $C_{23}H_{35}O_3N$—

Calculated (percent): C=73.95; H=9.45; O=12.85; N=3.75. Found (percent): C=74.11, C=73.93; H=9.25, H=9.28; O=12.90; N=3.80.

EXAMPLE 4

*Diacetyl Paravallaridine*

200 mg. of paravallaridine are heated for 2 hours at 100° C. with 3 cc. of acetic anhydride. After removing the excess of reagent by vacuum distillation, the residue is crystallised twice in acetone and yields 62 mg. of diacetyl paravallaridine.

The analysis gives, for an empirical formula of $C_{16}H_{37}O_5N$—

Calculated (percent): C=70.40; H=8.41; O=18.04. Found (percent): C=70.63; H=8.21; O=17.66.

EXAMPLE 5

*Mono-N-Acetyl-Paravallaridine*

50 mg. of diacetyl paravallaridine are heated for 30 minutes under reflux with 3 cc. of methanolic solution of N/10 potash. The reaction solution, diluted with 50 cc. of water, is extracted with chloroform (100 cc.—50 cc. and 50 cc.). The combined chloroformic solutions are washed with water, dried and distilled to dryness, and leave a residue which, crystallised in acetone, yields 33 mg. of mono-N-acetyl paravallaridine.

The analysis gives, for an empirical formula of $C^{24}H_{35}O_4N$—

Calculated (percent): C=71.79; H=8.79. Found (percent): C=71.51; H=8.91.

EXAMPLE 6

N-Methyl-Triol Derivative of Paravallaridine 150 mg. of N-methyl-paravallaridine are dissolved in 2cc. of tetrahydrofuran and 20 cc. of ether and heated under reflux with 200 mg. of LiAlH$_4$. After destroying the excess of reducing agent with a few drops of methanol and adding 150 cc. of water, the mixture is suitable acidified until the pH value is 5, using concentrated hydrochloric acid, and the organic solvents are removed by distillation. The remaining aqueous solution, acidified to pH 1, then has added thereto 20 g. of the double tartrate of sodium and potassium and then caustic soda until the pH value is 13. The precipitate formed is extracted with chloroform (1000 cc.—500 cc. and 500 cc.).

The chloroformic solutions are washed with water, dried and distilled, and leave 130 mg. of residue which, when recrystallised from methanol, yields 80 mg. of the triol.

The analysis gives, for an empirical formula of $C_{23}H_{39}O_3N$—

Calculated (percent): C=73.16; H=10.41. Found (percent): C=73.47; H=10.41.

EXAMPLE 7

Paravallaridine Hydrochloride

A solution of 300 mg. of paravallaridine in 20 cc. of alcohol at 96° C. is acidified to the pH-value 1 by careful addition of concentrated hydrochloric acid. By subsequent addition of 150 cc. of ether, a precipitate is formed, which, separated by filtration and recrystallised from alcohol at 96° C., yields 260 mg. of paravallaridine hydrochloride. M.P. 280° C.

Analysis of the product dried at 100° C. in vacuo:

|  | C | H | O | N | Cl |
|---|---|---|---|---|---|
| For $C_{22}H_{34}O_3NCl$: |  |  |  |  |  |
| Calculated, percent | 66.72 | 8.66 | 12.12 | 3.54 | 8.96 |
| Found, percent | 66.8 | 8.6 | 12.0 | 3.4 | 9.1 |

EXAMPLE 8

O-Acetyl-N-Methyl Paravallaridine 100 mg. of N-methyl paravallaridine are heated for 2 hours at 100° C. with 3 cc. of acetic anhydride. After eliminating the acetic anhydride excess by vacuum distillation, the white residue is purified by crystallisation in ether and then by sublimation. There are thus obtained 70 mg. of O-acetyl-N-methyl paravallaridine.

M.P.=170° C.; $(\alpha)_D$=—43° (C=0.23 chloroform).

Analysis for $C_{25}H_{37}O_4N$—

Calculated (percent): C=72.25; H=8.98; O=15.40.
Found (percent): C=72.03; H=881; O=15.30.

EXAMPLE 9

Triacetylated Derivative of N-Methyl Triol

TRI-O-ACETYLATED DERIVATIVE OF N-METHYL PARAVALLARIDINOL 250 mg. of N-methyl paravallaridine triol are heated for 2 hours to 100° C. with 6 cc. of acetic anhydride. After eliminating the acetic anhydride excess by vacuum distillation, the residue is dissolved in 50 cc. of benzene and the solution obtained is subjected to chromatography on 5 g. of alumina of activity I. By elution using the same solvent, there are recovered 215 mg. of product which, crystallised from ether, yields 10 mg. of the triacetylated derivative.

M.P.=137° C.; $(\alpha_D$=—46.8°±2 (C=0.16 chloroform). Analysis for $C_{29}H_{45}O_6N$—Calculated (percent): C=69.15; H=9.01; O=19.06. Found (percent): C=69.39; H=8.94; O=19.10.

EXAMPLE 10

N-Acetyl Paravallaridinic Acid 930 mg. of N-acetyl paravallaridine, dissolved in 100 cc. of alcoholic solution of twice-normal potash, are heated under reflux for 6 hours. The cooled reaction solution is diluted with 600 cc. of water, brought to a pH-value of 4 by progressive addition of a sufficient quantity of acetic acid, and extracted three times with chloroform, using 250 cc. on each occasion. The combined chloroformic solutions, washed with water, dried and distilled, only yield 48 mg. of N-acetyl paravallaridinic acid. However, the acetic solution already extracted with chloroform leaves a deposit of a white product which, isolated by filtration, washed with water and dried, weighs 565 mg.

The chloroformic residue and the 565 mg. previously isolated by filtration together yield by crystallisation in methanol, 510 mg. of N-acetyl paravallaridinic acid.

M.P.=278° C. Analysis for $C_{24}H_{37}N$—Calculated (percent): C=68.70; H=8.89; O=19.07. Found (percent): C=68.23, C=69.0; H=8.38, H=8.9; O=18.60.

Number of mg. of KOH consumed by one gramme of product—Calculated (percent): 133. Found (percent): 133 and 131.

EXAMPLE 11

Methylester of N-Acetyl Paravallaridinic Acid 300 mg. of N-acetyl paravallaridinic acid are agitated for 5 hours with 250 cc. of ether containing 1.5 g. of diazo-methane. During the agitation, 2 cc. of methanol are added on three occasions. The clear solution obtained is decolourised by adding just the sufficient quantity of acetic acid, washed with water, dried and distilled to dryness. The residue, crystallised in a mixture of acetone and hexane, yields 285 mg. of the methylester of N-acetyl paravallaridinic acid.

M.P.=208° C.; $(\alpha)_D^{20}$=—41.6°±2 (C=0.12 chloroform). Analysis for $C_{25}H_{39}O_5N$—Calculated (percent): C=69.25; H=9.07; O=18.45. Found (percent): C=70.2; H=8.8; O=17.76.

Labile hydrogen H+—Calculated (percent): 0.46. Found (percent): 0.46.

EXAMPLE 12

Dihydro-N-Methyl-Paravallaridine 200 mg. of paravallaridine dissolved in 10 cc. of acetic acid are catalytically hydrogenated for 5 hours in the presence of Adam's platinum. After removing the catalyst by filtration, the reaction liquid is diluted with 300 cc. of water, made alkaline with potash and the precipitate formed is extracted with chloroform (250 cc.—100 cc. and 100 cc.). The chloroformic solutions are washed wtih water, dried over sodium sulphate and distilled to dryness, and they leave 170 mg. of residue which, by crystallisation in acetone, gives 140 mg. of dihydro-N-methyl-paravallaridine.

The analysis gives, for an empirical formula $C_{23}H_{37}O_3N$—Calculated (percent): C=73.56; H=9.93; O=12.78. Found (percent): C=73.59; H=9.87; O=13.06. The infra-red spectrum of this compound is given in curve 11 of the accompanying drawing.

EXAMPLE 13

Dihydroparavallaridine (20 S)-3βN-METHYLAMINO-16α,20-DIHYDROXY-18-OIC LACTONE (→20)-5α-PREGNANE .5 g. of paravallaridine, dissolved in 50 cc. of acetic acid, are stirred for 3 hours under hydrogen in the presence of 500 mg. of platinum oxide. After eliminating the catalyst by filtration, the acetic solution is poured into 250 cc. of water. The whole is made alkaline with ammonia and extracted with 1 litre of chloroform. The chloroformic solution is washed with water, dried over sodium sulphate and distilled until a dry residue is obtained. By crystallisation in methanol, this latter yields 3.90 g. of dihydroparavallaridine.

M.P. 233° C. $(\alpha)_D=-20°$ (C=0.228 chloroform). Analysis for $C_{22}H_{35}O_3N$—Calculated (percent): C=73.09; H=9.76; O=13.28. Found (percent): C=73.2; H=9.6; O=13.3. The infra-red spectrum of this compound is given in curve 12 of the accompanying drawing.

EXAMPLE 14

*Diacetylated Derivative of Dihydroparavallaridine*

(20 S)-3β-N-METHYL-N-ACETYLAMINO-16α-ACETOXY-20-HYDROXY-18-OIC LACTONE (→20)-5α-PREGNANE 500 mg. of dihydroparavallaridine are heated for 4 hours to 100° with 10 cc. of acetic anhydride. After eliminating the excess reagent by vacuum distillation, the residue is crystallised in acetone and yields 330 mg. of diacetyl-dihydroparavallaridine. M.P. 260° C. $(\alpha_D^{20}=0° \pm 2$ (C=0.27 chloroform).

Analysis for $C_{26}H_{39}O_5N$—Calculated (percent): C=70.03; H=8.82; O=17.95; N=3.14. Found (percent): C=69.80; H=9.03; O=18.17. The infra-red spectrum of this compound is given in curve 13 of the accompanying drawing.

EXAMPLE 15

*Mono-N-Acetyl-Dihydroparavallaridine*

(20 S)-3β-N-METHYL-N-ACETYLAMINO-16α,20-DIHYDROXY-18-OIC LACTONE (→20)-5α-PREGNANE 150 mg. of diacetyl dihydroparavallaridine are heated under reflux for 30 minutes with 4 cc. of N/10 methanolic caustic potash solution. The reaction solution is poured into 50 cc. of water and the whole is extracted with 250 cc. of chloroform. After washing with water, drying over dry sodium sulphate and distilling, this chloroformic solution yields 120 mg. of a residue which, by crystallisation in methanol, gives 102 mg. of the mono-O-acetylated derivative of dihydroparavallaridine.

M.P.=310° C. $(\alpha)_D^{20}=-28°$ (C=0.17 chloroform). Analysis for $C_{24}H_{37}O_4N$—Calculated (percent): C=71.43; H=9.24; O=15.86; N=3.47. Found (percent): C=71.22; H=9.02; O=15.97. The infra-red spectrum of this compound is given in curve 14 of the accompanying drawing.

EXAMPLE 16

*O-Acetyl-N-Methyl-Dihydroparavallaridine*

(20 S)-3β-N-DIMETHYLAMINO-16α-ACETOXY-20-HYDROXY-18-OIC LACTONE (→20)-5α-PREGNANE 250 mg. of N-methyl dihydroparavallaridine are heated for 2 hours to 100° C. with 3 cc. of acetic anhydride. After removing the excess acetic anhydride by vacuum distillation, the white residue is crystallised in a mixture of acetone and hexane. There are thus obtained 160 g. of O-acetyl-N-methyl-dihydroparavallaridine.

M.P.=176° C. $(\alpha)_D^{20}=-25°$ (C=0.16 chloroform). Analysis for $C_{25}H_{39}O_4N$—Calculated (percent): C=71.89; H=9.41; O=15.33. Found (percent): C=71.72; H=9.20; O=15.38. The infra-red spectrum of this compound is given in curve 15 of the accompanying drawing.

EXAMPLE 17

*N-Methyl-Dihydroparavallaridine Triol*

(20 S)-3β-N-DIMETHYLAMINO-16α,18,20-TRIHYDROXY-5α-PREGNANE

Using a technique similar to that used for reducing the N-methyl-paravallaridine with LiAlH$_4$, 350 mg. of the N-methylated derivative of dihydroparavallaridine have yielded 220 mg. of N-methyl-dihydroparavallaridinol.

M.P.=262° C.; $(\alpha)_D=0 \pm 2$ (C=0.11 chloroform).

Analysis for $C_{23}H_{41}O_3N$—Calculated (percent): C=72.77; H=10.89; O=12.65. Found (percent): C=72.91; H=10.70; O=12.92. The infra-red spectrum of this compound is given in curve 16 of the accompanying drawing.

EXAMPLE 18

*16-Oxo-N-Methyl-Dihydroparavallarine*

(20 S)-3β-N-DIMETHYLAMINO-16-OXO-20-HYDROXY-18-OIC LACTONE (→20)-5α-PREGNANE 750 mg. of chromic anhydride dissolved in 25 cc. of water are added to the solution of 500 mg. of N-methyl-dihydroparavallaridine in 25 cc. of acetic acid. The whole is stirred for 5 hours at ordinary temperature, and then the excess chromic anhydride is destroyed by progressive dropwise addition of methanol. After dilution with 100 cc. of iced water the solution is made alkaline with caustic soda and the product which precipitates is extracted with chloroform. The chloroformic solution washed with water and then dried over dry sodium sulphate is distilled. There remain 460 mg. of a faintly coloured residue which, by crystallisation in a mixture of acetone and ether, yields 310 mg. of the ketone.

M.P.=206° C.; $(\alpha)_D=-247°$ (C=0.2 chloroform). Analysis for $C_{23}H_{35}O_3N$—Calculated (percent): C=73.95; H=9.45; O=12.85. Found (percent): C=74.12; H=9.49; O=12.87. The infra-red spectrum of this compound is given in curve 17 of the accompanying drawing.

EXAMPLE 19

*16-Oxo-N-Acetyl-Dihydroparavallarine*

(20 S)-3β-N-METHYL-N-ACETYLAMINO-16-OXO-20-DIHYDROXY-18-OIC LACTONE (→20)-5α-PREGNANE

The mixture of 200 mg. of mono-N-acetyl diydroparavallaridine dissolved in 5 cc. of acetic acid and of 500 mg. of chromic anhydride dissolved in 10 cc. of water is heated for 30 minutes on a water bath, and then stirred for 2 hours at ordinary temperature.

The yellow reaction solution is made alkaline with caustic soda until the colour changes to green, and then it is extracted with chloroform. The chloroformic solution is washed with water, dried and distilled, to produce a residue weighing 156 mg., which yields by crystallisation in acetone, 122 mg. of 16-oxo-N-acetyl-dihydroparavallarine.

M.P.=266° C. $(\alpha)_D=-221°$ (C=0.161 chloroform). Analysis for $C_{24}H_{35}O_4N$—Calculated (percent): C=71.79; H=8.79; O=15.90; N=3.49. Found (percent): C=71.25; H=8.73; O=15.27; N=3.43. The infra-red spectrum of this compound is given in curve 18 of the accompanying drawing.

EXAMPLE 20

*16-Epi-N-Methyl-Dihydroparavallaridinetriol*

(20 S)-3β-N-DIMETHYLAMINO-16β,18,20-TRIHYDROXY-5α-PREGNANE 100 mg. of 16-oxo-N-methyl-dihydroparavallarine dissolved in 3 cc. of tetrahydrofuran and 20 cc. of anhydrous ether are heated under reflux for 6 hours with 300 mg. of LiAlH$_4$. After destroying the excess reagent by adding 20 cc. of moist ether, 1 cc. of methanol and 20 cc. of water, the mixture is acidified to pH 4 by adding dilute hydrochloric acid, and then the organic solvents are driven off by distillation. The remaining aqueous solution has added thereto 25 g. of Seignette salt, and then caustic soda until the pH-value is 13 and it is extracted with chloroform. The chloroformic solution is decanted, washed with water and dried, and finally it is distilled. It leaves a residue of 103 mg., which by crystallisation in acetone, yields 60 mg. of 16-epi-N-methyldihydroparavallaridinetriol. M.P.=220° C. $(\alpha)_D=+34°$ (C=0.16 chloroform).

Analysis for $C_{23}H_{41}O_3N$—Calculated (percent): C=72.77; H=10.89; O=12.65; N=3.69. Found (percent): C=73.74; H=10.88; O=11.67; N=3.46.

EXAMPLE 21

16-Epi-N-Methyl-Dihydroparavallaridine (20 S)-3β N-DIMETHYLAMINO-16β,20-DIHYDROXY-18-OIC LACTONE (→20)-5α-PREGNANE A solution of 8 mg. of LiAlH$_4$ in 100 cc. of ether is added dropwise and while stirring to the solution of 100 mg. of 16-oxo-N-methyl dihydroparavallarine in 1 cc. of tetrahydrofuran. After stirring for 1 hour at ordinary temperature, the slight excess of reducing agent is destroyed by adding 10 cc. of ether saturated with water, 10 drops of methanol and 20 cc. of water. The whole is acidified to a pH-value of 4 by adding hydrochloric acid, and then the organic solvents are removed by distillation. The aqueous solution is brought to a pH-value of 1 by adding hydrochloric acid, and then after adding 20 g. of Seignette salt, the whole is made alkaline to a pH-value of 13 by the addition of sodium hydroxide solution and extracted with 250 cc. of chloroform. The chloroformic solution is decanted, washed with water and dried over sodium sulphate and finally it is distilled until there is obtained a dry residue weighing 102 mg. By crystallisation from methanol, this residue yields 38 mg. of 16-epi-N - methyl - dihydroparavallaridine. M.P.=238° C. $(\alpha)_D = 0° \pm 2$ (C=0.16 chloroform).

Analysis for $C_{23}H_{37}O_3N$—Calculated (percent): C=73.56; H=9.93. Found (percent): C=72.64, C=72.73; H=9.60, H=9.74. The infra-red spectrum of this compound is given in curve 20 of the accompanying drawing.

EXAMPLE 22

Oxime of 16-Oxo-N-Acetyl-Dihydroparavallarine (20 S)-3β N-METHYL-N-ACETYLAMINO-16-OXIMINO-20-HYDROXY-18-OIC LACTONE (→20)-5α-PREGNANE 380 mg. of 16-oxo-N-acetyl-dihydroparavallarine are heated for 8 hours under reflux with a solution of 400 mg. of hydroxylamine hydrochloride and 800 mg. of sodium acetate in 40 cc. of methanol and 5 cc. of water.

The reaction solution, diluted with 400 cc. of water, is extracted 3 times, using 100 cc. of chloroform on each occasion.

The combined chloroformic solutions are washed with water, dried over sodium sulphate and distilled, until there is obtained a dry residue which weighs 402 mg. By crystallisation in methanol, it supplies 290 mg. of oxime. M.P.=306° C.; $(\alpha)_D^{20}=-183°$ (C=0.41 chloroform).

Analysis for $C_{24}H_{36}O_4N_2$—Calculated (percent): C=69.20; H=8.71; N=6.73. Found (percent): C=69.07; H=8.98; N=7.29. The infra-red spectrum of this compound is given in curve 21 of the accompanying drawing.

EXAMPLE 23

Dioxolane Derivative of 16-Oxo-N-Acetyldihydroparavallarine (20 S)-3β N-METHYL-N-ACETYLAMINO - 16 - ETHYLENE-DIOXY - 20 - HYDROXY - 18 - OIC LACTONE (→20)-5α-PREGNANE 121 mg. of 16-oxo-N-acetyl-dihydroparavallarine are first heated for 30 minutes under reflux with 15 cc. of ethylene glycol and 50 cc. of anhydrous benzene, the benzene is then eliminated by distillation and 10 mg. of paratoluene sulphonic acid and 15 cc. of benzene are then added. The whole is then heated for 21 hours, during which the benzene is continuously and regularly eliminated by distillation, while the reaction volume is kept constant by regular compensating addition of 500 cc. of anhydrous benzene. This technique thus renders it possible for the water formed in the reaction to be removed azeotropically.

Finally, all the benzene of the reaction medium is removed by distillation and the residue is diluted with 100 cc. of 5% aqueous solution of sodium carbonate. The product, which is salted out, is isolated by filtration, washed with water and then redissolved in 20 cc. of methanol, and is again salted out with 50 cc. of 5% aqueous solution of acid sodium carbonate. The thus purified product which precipitates is again filtered and washed with water, whereupon it is recrystallised from methanol. There are thus obtained 58 mg. of dioxolane derivative. M.P.=272° C.; $(\alpha)_D^{20}=-59°$ (C=0.34 chloroform).

Analysis for $C_{26}H_{39}O_5N$—Calculated (percent): C=70.08; H=8.82; O=17.95. Found (percent): C=69.98; H=8.72; O=17.03. The infra-red spectrum of this compound is given in curve 22 of the accompanying drawing.

EXAMPLE 24

16-Oxo-N-Ethyl-Dihydroparavallarinol (20 S)-3β N-METHYL-N-ETHYLAMINO-16-OXO-18,20-DIHYDROXY-5α-PREGNANE 140 mg. of dioxolane derivative of 16-oxo-N-acetyl-dihydroparavallarine dissolved in 10 cc. of tetrahydrofuran and 150 cc. of ethyl ether are heated for 8 hours under reflux with 150 mg. of lithium aluminium hydride. After the excess of reducing agent has been destroyed by careful addition of ether saturated with water, the whole is acidified to pH 4 and the organic solvents are removed by distillation. The remaining aqueous solution is acidified to pH 1 and heated for 5 minutes to 100° C. After cooling and after adding 20 g. of sodium-potassium tartrate, the solution is made alkaline at pH 12–13 by adding caustic soda solution and extracted with 500 cc. of chloroform. The chloroformic solution separated by decantation is washed with water, dried over sodium sulphate and finally distilled until a dry residue weighing 130 mg. is obtained. By crystallisation in acetone, this residue yields 35 mg. of the desired product. M.P.=163° C.; $(\alpha)_D^{20}=-100°$ (C=0.2 chloroform).

Analysis for $C_{24}H_{41}O_3N$—Calculated (percent): C=73.65; H=10.5. Found (percent): C=73.93; H=10.13. The infra-red spectrum of this compound is given in curve 23 of the accompanying drawing.

The dihydrogenated derivatives of paravallaridine which form the subject of the above Examples 12 to 24 correspond to the following formula:

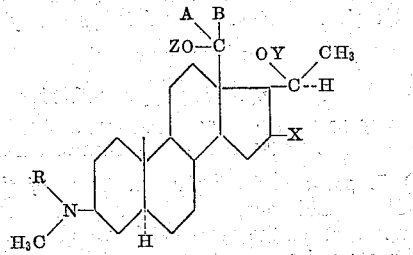

in which R represents a low alkyl radical, a hydrogen atom or an acetyl radical, A, B, Y and Z have the meanings given above and —X in the 16-position represents —OR$_1$, where R$_1$ is a hydrogen atom or an acetyl radical, =O, =N—OH or even

In the nomenclature used in Examples 18 and 19, the name of paravallarine has been used, while mentioning 16-oxo in the prefix, because this term is more exact; although the compounds are derived from paravallaridine.

Other examples are given below which are to serve essentially for supporting the evidence given at the start of the specification concerning the accuracy of the formula of the paravallaridine.

EXAMPLE 25

*N-Acetyl-Δ-15-Dihydroparavallarine*

(20 S)-3β-METHYL-N-ACETYLAMINO-20-HYDROXY-18-OIC LACTONE (→20)-5α-PREGNA-15-ENE

This compound corresponds to the formula

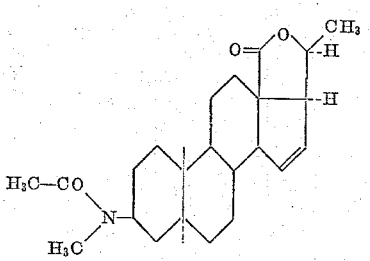

it is prepared from the 16-oxo-N-acetyl-dihydroparavallarine.

5 g. of powdered zinc are stirred for 5 minutes with 400 mg. of mercuric chloride, 10 drops of concentrated hydrochloric acid and 5 cc. of water. The aqueous layer is decanted and then the zinc amalgam formed is washed twice with 50 cc. of water by decantation and then finally covered with 3 cc. of water and 5 cc. of concentrated hydrochloric acid.

To the zinc amalgam suspension thus obtained, there is added the solution of 170 mg. of 16-oxo-N-acetyl-dihydroparavallarine in 2 cc. of water, 2 cc. of methanol and 0.05 cc. of concentrated hydrochloric acid. The whole is then heated to boiling point for 10 hours while stirring magnetically. The zinc in excess is removed by filtration and the filtrate, diluted with 150 cc. of water and made alkaline to a pH-value of 13 with sodium hydroxide solution, is extracted with 250 cc. of chloroform. The chloroformic solution is decanted, washed twice with water, dried over dry sodium sulphate and finally distilled until a dry residue weighing 102 mg. is obtained. This residue is dissolved in 5 cc. of benzene and subjected to chromatography on 0.5 g. of alumina.

By elution with ether, there are obtained 50 mg. of a product which is recrystallised from acetone. M.P.=258° C.; $(\alpha)_D = -13.5°$ (C=0.25 chloroform).

Analysis for $C_{24}H_{35}O_3N$—Calculated (percent): C=74.76; H=9.15; O=12.45. Found (percent): C=74.58; H=9.24; O=12.77. The infra-red spectrum of this compound is given in curve 24 of the accompanying drawing.

EXAMPLE 26

*N-Acetyl-Dihydroparavallarine*

(20 S)-3β-METHYL-N-ACETYLAMINO-20-HYDROXY-18-OIC LACTONE (→20)-5α-PREGNANE (a) *Preparation from the compound of the Example 25.*—50 mg. of N-acetyl-Δ₁₅-dihydroparavallarine are dissolved in 3 cc. of the mixture of acetic acid and water in equal parts and are hydrogenated at normal pressure and temperature for 2 hours in the presence of a catalyst with Adam's platinum base. The solution is filtered on kieselguhr in order to remove the catalyst and the filtrate, diluted with 50 cc. of water, is made alkaline with ammonia and extracted with 100 cc. of chloroform. The decanted chloroformic solution is washed in water, dried over sodium sulphate and finally distilled, until there is obtained a dry residue weighing 47 mg. This residue, crystallised in acetone, gives 39 mg. of needles. M.P.=259° C.; $(\alpha)_D = -14°$ (C=0.26 chloroform).

The infra-red spectrum given in curve 25 of the drawing is strictly identical to that of the N-acetyl dihydroparavallarine for reference purposes and prepared from dihydroparavallarine.

Analysis for $C_{24}H_{37}O_3N$—Calculated (percent): C=74.38; H=9.62. Found (percent): C=74.64; H=9.46.

(b) *Preparation from dihydroparavallarine.*—250 mg. of dihydroparavallarine are heated to 100° C. for 3 hours with 8 cc. of acetic anhydride. After eliminating the excess of reagent by vacuum distillation, the residue is crystallised twice in acetone. There are thus obtained 208 mg. of N-acetyl-dihydroparavallarine. M.P.=258–259° C.; $(\alpha)_D = 14°$ (C=0.28 chloroform).

Analysis for $C_{24}H_{37}O_3N$—Calculated (percent): C=74.38; H=9.62; O=12.39. Found (percent): C=74.59; H=9.62; O=12.51.

EXAMPLE 27

*N-Methyl-15-Dihydroparavallarine*

(20 S)-3β-N-DIMETHYLAMINO-20-HYDROXY-18-OIC LACTONE (→20)-5-ALPHA-PREGNA-15-ENE 10 g. of powdered zinc are stirred for 5 minutes with 800 mg. of mercuric chloride, 20 drops of hydrochloric acid and 10 cc. of water. The aqueous layer is decanted, and then the zinc amalgam which has formed is washed twice with 100 cc. of water by decantation, and then finally covered with 5 cc. of water and 8 cc. of concentrated hydrochloric acid.

To the suspension of zinc amalgam thus obtained, there is added the solution of 400 mg. of 16-oxo-N-methyl dihydroparavallarine in 4 cc. of water, 4 cc. of methanol and 0.5 cc. of concentrated hydrochloric acid.

The whole is then heated to boiling point for 5 hours while stirring magnetically. The excess zinc is eliminated by filtration and the filtrate is diluted with 500 cc. of water and brought to pH 13 by sodium hydroxide solution and is extracted with 500 cc. of chloroform. The chloroformic solution is decanted, washed twice with water, dried over dry sodium sulphate and finally distilled until a dry residue weighing 335 mg. is obtained. By crystallisation in acetone, this residue yields 140 mg. of N-methyl-15-dihydroparavallarine. M.P.=147° C.; $(\alpha)_D^{20} = -8.3°$ (C=0.24 chloroform).

Analysis for $C_{23}H_{35}O_2N$—Calculated (percent): C=77.26; H=9.87. Found (percent): C=76.24; H=9.68. The infra-red spectrum of this compound is given in curve 26 of the accompanying drawing.

EXAMPLE 28

*N-Methyl Dihydroparavallarine*

(20 S)-3β-N-DIMETHYLAMINO-20-HYDROXY-18-OIC LACTONE (→20)-5α-PREGNANE (a) *Preparation from the compound of Example 27.*—60 mg. of N-methyl-Δ15-dihydroparavallarine, dissolved in 3 cc. of a mixture of acetic acid and water in equal parts, are hydrogenated at ordinary pressure and temperature for 2 hours in the presence of a catalyts having a platinum base, prepared according to Adams. The solution is filtered on kieselguhr in order to eliminate the catalyst and the filtrate, diluted with 50 cc. of water, is made alkaline with caustic soda and extracted with 150 cc. of chloroform. The decanted chloroformic solution is washed with water, dried over sodium sulphate and finally distilled until there is obtained a dry residue weighing 52 mg. This residue, crystallised from acetone and hexane, gives 37 mg. of needles. M.P.=148° C.; $(\alpha)_D^{20} = -21.8°$ (C=0.21 chloroform). The infra-red spectrum, given in curve 27, is strictly identical with that of the reference N-methyl dihydroparavallarine, the preparation of which from the dihydroparavallarine is described below.

(b) *Preparation from dihydroparavallarine.*—200 mg. of dihydroparavallarine are heated for 6 hours to 100° C. with 3 cc. of 30% formol solution and 4 cc. of formic acid. The reaction solution, diluted with 100 g. of ice, is made alkaline to a pH value of 13 by sodium hydroxide solution. The precipitate which forms is extracted by 200 cc. of ether. The ethereal solution is decanted, washed in water, dried over sodium sulphate and distilled, whereby it leaves a residue of 209 mg., which yields 92 mg. of N-methyl-dihydroparavallarine by crystallisation in acetone and hexane and recrystallisation from ether. M.P.=148° C.; (α)$_D^{20}$=22° (C=0.30 chloroform).

Analysis for $C_{23}H_{37}O_2N$—Calculated (percent): C=76.83; H=10.37; O=8.90. Found (percent): C=76.89; H=10.28; O=8.98.

EXAMPLE 29

*N-Ethyl-Δ15-Dihydroparavallarinol*

(20 S)-3βN-METHYL-N-ETHYLAMINO-18,20-DIHYDROXY-5α-PREGNA-15-ENE

The solution of 200 mg. of N-acetyl-Δ15-dihydroparavallarine in 2 cc. of tetrahydrofuran and 20 cc. of anhydrous ether is heated under reflux for 6 hours with 200 mg. of LiAlH$_4$. The solution has successively added thereto 25 cc. of ether saturated with water, 1 cc. of methanol and then 100 cc. of water and a quantity of hydrochloric acid sufficient to bring the solution to a pH value of 1. The organic solvents are eliminated by distillation and the aqueous solution then has added thereto 20 g. of sodium-potassium tartrate and sodium hydroxide solution to reach the pH value 13. The precipitate which forms is extracted with 250 cc. of chloroform. The chloroformic solution is decanted, washed with water and dried over sodium sulphate and is distilled whereby a dry residue which weighs 190 mg. is obtained which yields by crystallisation in a mixture of methanol and acetone, 110 mg. of N-ethyl-Δ15-dihydroparavallarine. M.P.=206° C.; (α)$_D^{20}$=+24° (C=0.27 chloroform).

Analysis for $C_{24}H_{41}O_2N$—Calculated (percent): C=76.75; H=11.00. Found (percent): C=76.58; H=10.82. The infra-red spectrum of this compound is given in curve 28 of the accompanying drawing.

EXAMPLE 30

*N-Ethyl Dihydroparavallarinol*

(20 S)-3βN-METHYL-N-ETHYLAMINO-18,20-DIHYDROXY 5α-PREGNANE (a) *Preparation from N-ethyl-Δ15-dihydroparavallarinol.*—100 mg. of N-ethyl-Δ15-dihydroparavallarinol, dissolved in 50 cc. of the mixture of acetic acid and water in equal parts, are hydrogenated at ordinary pressure and temperature for 3 hours in the presence of a catalyst having an Adam's platinum base. The solution is filtered on kieselguhr in order to separate the catalyst and the filtrate, diluted with 50 cc. of water, is made alkaline with sodium hydroxide solution and extracted with 250 cc. of chloroform. The decanted chloroformic solution is washed with water, dried over sodium sulphate and finally is distilled until a dry residue weighing 90 mg. is obtained. This residue, crystallised from a mixture of methanol and acetone, yields 36 mg. of needles. M.P=212° C.; (α)$_D^{20}$=23.5° (C=0.18 chloroform). The infra-red spectrum, shown on curve 29 of the accompanying drawing, is identical with that of N-ethyl dihydroparavallarinol, the preparation of which from N-acetyl dihydroparavallarine is described below.

(b) *Preparation from N-acetyl dihydroparavallarine.*—The solution of 200 mg. of N-acetyl dihydroparavallarine in 2 cc. of tetrahydrofuran and 20 cc. of anhydrous ether is heated under reflux for 6 hours with 200 mg. of LiAlH$_4$. The solution has successively added thereto 25 cc. of ether saturated with water, 1 cc. of methanol and then 100 cc. of water, followed by a sufficient quantity of hydrochloric acid to achieve the pH value 1. The organic solvents are eliminated by distillation and the aqueous solution then has added thereto 20 g. of sodium-potassium tartrate and sodium hydroxide solution in order to reach the pH value 13. The precipitate is extracted with 250 cc. of chloroform. The decanted chloroformic solution, washed with water and dried over sodium sulphate, leaves by distillation a residue weighing 175 mg., and this by crystallisation in acetone and methanol yields 122 mg. of N-ethyl dihydroparavallarinol. M.P.=212° C.; (α)$_D^{20}$=23.4° (C=0.26 chloroform).

Analysis for $C_{24}H_{43}O_2N$—Calculated (percent): C=76.34; H=11.48. Found (percent): C=76.17; H=11.28.

What I claim is:

1. A compound of the formula:

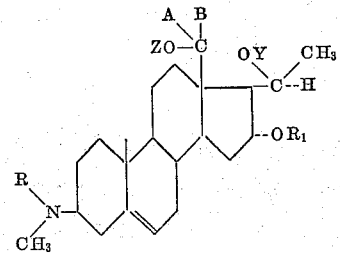

wherein

R and R$_1$ are radicals selected from the group consisting of hydrogen, a lower alkyl radical, and an acetyl radical;

Y is a member of the group consisting of an acetyl radical, a hydrogen atom, and a bond with the 18-carbon atom;

Z is a member of the group consisting of a bond with the 18-carbon atom, a hydrogen atom, and an acetyl radical;

A is a hydrogen atom when Z is a hydrogen or an acetyl radical, and nothing when Z is a bond with the 18-carbon atom;

B is a member of the group consisting of a hydrogen atom, the radical OR$_2$, and a bond jointly formed with Y from the 18-carbon atom to the oxygen atom fixed on the 20-carbon atom; and R$_2$ is a member of the group consisting of a hydrogen atom and an acetyl radical.

2. Compounds of the general formula:

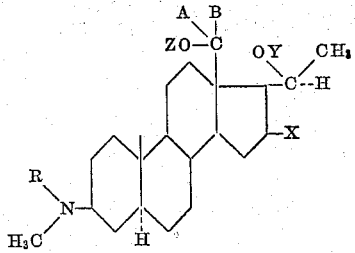

wherein

R is a member of the group consisting of a lower alkyl radical, a hydrogen atom and an acetyl radical;

Y is a member of the group consisting of an acetyl radical, a hydrogen atom, and a bond with the 18-carbon atom;

Z is a member of the group consisting of a bond with the 18-carbon atom, a hydrogen atom, and an acetyl radical;

A is a hydrogen atom when Z is hydrogen or an acetyl radical, and nothing when Z is a bond with the 18-carbon atom;

B is a member of the group consisting of a hydrogen atom, the radical OR$_2$, and a bond jointly formed with Y from 18-carbon atom to the oxygen atom fixed on the 20-carbon atom; and R$_2$ is a member of the group consisting of a hydrogen atom and an acetyl radical; and X in the 16-position is a member of the group consisting of OR$_2$, =O, =N—OH, and

3. A compound of the formula:

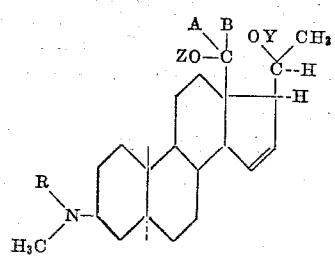

wherein

R is a member of the group consisting of hydrogen, a lower alkyl radical;

Y is a member of the group consisting of an acetyl radical, a hydrogen atom, and a bond with the 18-carbon atom;

Z is a member of the group consisting of a bond with the 18-carbon atom, a hydrogen atom, and an acetyl radical;

A is a hydrogen atom when Z is hydrogen or an acetyl radical, and nothing when Z is a bond with the 18-carbon atom;

B is a member selected from the group consisting of a hydrogen atom, the radical $OR_2$, and a bond jointly formed with Y from the 18-carbon atom to the oxygen atom fixed on the 20-carbon atom;

$R_2$ is a member of the group consisting of a hydrogen atom and an acetyl radical.

4. (20S) - 3βN-methylamino-16α,20-dihydroxy-18-oic lactone (→20)-pregna-5-ene.

5. (20S) - 3βN - dimethylamino - 16α,20 - dihydroxy-18-oic lactone (→20)-pregna-5-ene.

6. (20S) - 3βN - methyl - N-acetylamino-16α-acetoxy-20-hydroxy-18-oic lactone (→20) pregna-5-ene.

7. (20S) - 3βN - dimethylamino - 16α,18,20 - trihydroxy pregna-5-ene.

8. (20S) - 3βN - methyl - N - acetylamino - 16α,20-dihydroxy-18-methoxycarbonyl pregna-5-ene.

9. (20S) - 3βN - dimethylamino - 16α,20 - dihydroxy-18-oic lactone (→20) 5α-pregnane.

10. (20S) - 3βN - methylamino - 16α,20 - dihydroxy-18-oic lactone (→20) 5α-pregnane.

11. (20S)-3βN - dimethylamino-16α,18,20 - trihydroxy-5α-pregnane.

12. (20S) - 3βN - dimethylamino -16 - oxo - 20 - hydroxy-18-oic lactone (→20) 5α-pregnane.

13. (20S) - 3βN - methyl - N - acetylamino - 16 - oxo-20-hydroxy-18-oic lactone (→20) 5α-pregnane.

14. (20S)-3βN-dimethylamino-16β,18,20 - trihydroxy-5α-pregnane.

15. (20S) - 3βN - methyl - N - ethylamino - 16 - oxo-18,20-dihydroxy-5α-pregnane.

16. (20S) - 3βN - methyl - N - ethylamino - 18,20-dihydroxy-5α-pregna-15-ene.

17. (20S) - 3βN - methyl - N - acetylamino - 20 - hydroxy-18-oic lactone (→20)-5α-pregna-15-ene.

18. (20S) - 3βN - dimethylamino - 20 - hydroxy - 18-oic lactone (→20)-5α-pregna-15-ene.

19. A process for the preparation of alkaloids of the paravallarine series which comprises crushing a plant material selected from the group consisting of: the leaves, stalks and roots of the plant *Paravallaris microphylla* Pitard; reducing the crushed, material to powder; mixing the powder with an aqueous ammonia solution to make the pH value of the resulting mixture higher than 7; extracting the mixture with a water immiscible, hydroxyl group-free solvent, whereby the base alkaloids originally contained in the plant material are collected in the organic solvent.

20. A process as claimed in claim 19, wherein the alkaloids collected in said organic solvent are dissolved in a dilute aqueous solution of a mineral acid, the pH value of the resulting acid alkaloid solution is raised above 7, whereby the alkaloids precipitate, said precipitated alkaloids are dissolved in a water immiscible, hydroxyl-group free solvent, and the organic solution so obtained is treated with an oxalic acid solution to obtain the oxalates of said alkaloids.

No references cited.